(12) United States Patent
Loehr et al.

(10) Patent No.: US 10,411,789 B2
(45) Date of Patent: Sep. 10, 2019

(54) SCHEDULING MECHANISM FOR PROSE RELAYS SERVING REMOTE UES

(71) Applicant: Panasonic Intellectual Property Corporation of America, Torrance, CA (US)

(72) Inventors: Joachim Loehr, Hessen (DE); Prateek Basu Mallick, Hessen (DE); Takako Hori, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/811,321

(22) Filed: Nov. 13, 2017

(65) Prior Publication Data

US 2018/0069618 A1     Mar. 8, 2018

Related U.S. Application Data

(63) Continuation of application No. PCT/JP2016/002974, filed on Jun. 21, 2016.

(30) Foreign Application Priority Data

Jul. 31, 2015  (EP) .................................... 15179352

(51) Int. Cl.
    *H04B 7/155*     (2006.01)
    *H04L 12/835*    (2013.01)
    (Continued)

(52) U.S. Cl.
    CPC ......... *H04B 7/15542* (2013.01); *H04L 47/30* (2013.01); *H04W 72/1263* (2013.01);
    (Continued)

(58) Field of Classification Search
    CPC .............. H04B 7/15542; H04W 88/04; H04W 72/1263; H04W 72/0406; H04W 72/08; H04L 47/30
    See application file for complete search history.

(56) References Cited

U.S. PATENT DOCUMENTS 10,045,233 B2 *  8/2018  Shoshan ................. H04W 4/90
2007/0202803 A1  8/2007  Miyoshi
(Continued)

FOREIGN PATENT DOCUMENTS

CN     102577496 A    7/2012
JP     2005-295512 A  10/2005
(Continued)

OTHER PUBLICATIONS

Communication pursuant to Article 94(3) EPC, dated Dec. 20, 2017, for the related European Patent Application No. 15 179 352.8-1857, 9 pages.
(Continued)

*Primary Examiner* — Jay P Patel
(74) *Attorney, Agent, or Firm* — Seed IP Law Group LLP

(57) ABSTRACT

The present disclosure relates to a method for scheduling radio resources for a relay user equipment (UE) serving as a relay for remote UEs. Remote data is relayed by the relay UE between the remote UEs and a radio base station (BS). A remote scheduling identification is configured for addressing remote logical channels carrying the remote data. A relay scheduling identification is configured for addressing one or more relay logical channels carrying relay data. The relay UE receives, from the BS, a remote resource assignment, assigning radio resources to the relay UE for exchanging the remote data with the BS, the remote resource assignment being addressed to the remote scheduling identification. The relay UE further receives, from the BS, a relay resource assignment, assigning radio resources to the relay UE for
(Continued)

exchanging the relay data with the BS, the relay resource assignment being addressed to the relay scheduling identification.

20 Claims, 15 Drawing Sheets

(51) Int. Cl.
*H04W 72/12* (2009.01)
*H04W 88/04* (2009.01)
*H04W 72/04* (2009.01)
*H04W 72/08* (2009.01)

(52) U.S. Cl.
CPC ........ *H04W 88/04* (2013.01); *H04W 72/0406* (2013.01); *H04W 72/08* (2013.01)

(56) References Cited

U.S. PATENT DOCUMENTS

| | | | |
|---|---|---|---|
| 2009/0135933 A1 | 5/2009 | Miyoshi | |
| 2012/0015661 A1* | 1/2012 | Awad | H04B 7/15542 455/445 |
| 2012/0127863 A1 | 5/2012 | Yi et al. | |
| 2012/0236782 A1* | 9/2012 | Bucknell | H04B 7/155 370/315 |
| 2013/0150108 A1 | 6/2013 | Yang et al. | |
| 2014/0185517 A1 | 7/2014 | Yi et al. | |
| 2015/0146677 A1 | 5/2015 | Ito | |
| 2015/0173120 A1* | 6/2015 | Yamada | H04W 36/0072 370/331 |
| 2016/0338094 A1* | 11/2016 | Faurie | H04W 72/085 |
| 2016/0338095 A1* | 11/2016 | Faurie | H04W 28/0278 |
| 2018/0063832 A1* | 3/2018 | Yamada | H04W 72/0413 |
| 2018/0069664 A1* | 3/2018 | Khoryaev | H04L 1/1621 |
| 2018/0077608 A1* | 3/2018 | Jung | H04W 28/02 |
| 2018/0077749 A1* | 3/2018 | Yamada | H04W 76/38 |
| 2018/0092017 A1* | 3/2018 | Freda | H04W 76/14 |
| 2018/0098290 A1* | 4/2018 | Yu | H04W 52/241 |
| 2018/0146494 A1* | 5/2018 | Khoryaev | H04W 76/14 |

FOREIGN PATENT DOCUMENTS

| | | |
|---|---|---|
| JP | 2013-183202 A | 9/2013 |
| JP | 2014-036283 A | 2/2014 |
| WO | 2011/021407 A1 | 2/2011 |
| WO | 2014/030193 A1 | 2/2014 |

OTHER PUBLICATIONS

Kyocera, "Consideration of establishment of ProSe UE-to-Network Relays," R2-152600, 3GPP TSG-RAN WG2 #90, Agenda item: 7.5.1.3, Fukuoka, Japan, May 25-29, 2015, 6 pages.

Coolpad, "Discussion on Resource Allocation in ProSe UE-to-Network Relay," R2-152346, 3GPP TSG-RAN WG2 #90, Agenda item: 7.5.1.4, Fukuoka, Japan, May 25-29, 2015, 4 pages.

Qualcomm Incorporated, "One-to-one ProSe Direct Communication considerations," S2-143302, SA WG2 Meeting #105, Agenda Item: 7.13, Sapporo, Japan, Oct. 13-17, 2014, 6 pages.

International Search Report of PCT application No. PCT/JP2016/002974 dated Aug. 23, 2016.

3GPP TS 36.211, V12.6.0, "3rd Generation Partnership Project; Technical Specification Group Radio Access Network; Evolved Universal Terrestrial Radio Access (E-UTRA); Physical channels and modulation", Jun. 2015.

3GPP TS 36.321, V12.6.0, "3rd Generation Partnership Project; Technical Specification Group Radio Access Network; Evolved Universal Terrestrial Radio Access (E-UTRA); Medium Access Control (MAC) protocol specification", Jun. 2015.

3GPP TS 23.203, V13.4.0, "3rd Generation Partnership Project; Technical Specification Group Services and System Aspects; Policy and charging control architecture", Jun. 2015.

3GPP TS 36.212, V12.5.0, "3rd Generation Partnership Project; Technical Specification Group Radio Access Network; Evolved Universal Terrestrial Radio Access (E-UTRA); Multiplexing and channel coding", Jun. 2015.

3GPP TR 36.843, V12.0.1, "3rd Generation Partnership Project; Technical Specification Group Radio Access Network; Study on LTE Device to Device Proximity Services; Radio Aspects", Mar. 2014.

3GPP TR 23.713, version,V1.4.0, "3rd Generation Partnership Project; Technical Specification Group Services and System Aspects; Study on extended architecture support for proximity-based services", Jun. 2015.

3GPP TS 36.300, V13.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", Jun. 2015.

3GPP TS 23.303, V13.0.0, "3rd Generation Partnership Project; Technical Specification Group Services and System Aspects; Proximity-based services (ProSe); Stage 2", Jun. 2015.

3GPP TSG RAN WG2 #89, R2-151169, "Considerations on the UE-to-Network Relays", Apr. 2015.

* cited by examiner

STATE 1: UL COVERAGE
STATE 2: DL COVERAGE
STATE 3: CP UE-RELAY COVERAGE
STATE 4: OUT OF COVERAGE

SCHEDULING MECHANISM FOR PROSE RELAYS SERVING REMOTE UES

BACKGROUND

1. Technical Field

The present disclosure relates to methods for scheduling radio resources to a relay user equipment serving as a relay for remote user equipment(s). The present disclosure is also providing the relay user equipment and a radio base station for participating in the methods described herein.

2. Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade.

The work item (WI) specification on Long Term Evolution (LTE) called Evolved UMTS Terrestrial Radio Access (UTRA) and evolved UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations toward the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g. parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service providers Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface toward the home HSS for roaming user equipments.

Component Carrier Structure in LTE

The downlink component carrier of a 3rd Generation Partnership Project (3GPP) LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a given number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N^{DL}_{RB} * N^{RB}_{SC}$ subcarriers and $N^{DL}_{symb}$ OFDM symbols. $N^{DL}_{RB}$ is the number of resource blocks within the bandwidth. The quantity $N^{DL}_{RB}$ depends on the downlink transmission bandwidth configured in the cell and shall fulfill $N_{RB}^{min,DL} \leq N_{RB}^{DL} \leq N_{RB}^{max,DL}$, where $N^{min,DL}_{RB}=6$ and $N^{max,DL}_{RB}=110$ are respectively the smallest and the largest downlink bandwidths, supported by the current version of the specification. $N^{RB}_{SC}$ is the number of subcarriers within one resource block. For normal cyclic prefix subframe structure, $N^{RB}_{SC}=12$ and $N^{DL}_{symb}=7$.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g. 7 OFDM symbols) and consecutive subcarriers in the frequency domain as exemplified in FIG. 2 (e.g. 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 12.6.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair". The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3GPP.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands. All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g. barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n*300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmission(s) need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured at the moment for one UE.

The configuration and reconfiguration, as well as addition and removal, of component carriers can be performed by RRC. Activation and deactivation is done e.g. via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink. When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Layer 2—MAC Layer/Entity, RRC Layer

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by e.g. the 3GPP technical standard TS 36.321, current version 12.6.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

FIG. 3 illustrates one possible structure for the UE-side MAC entity, as presented in the technical standard TS 36.321, current version 12.6.0, section 4.2.1 "MAC Entities", incorporated in its entirety herein by reference. The following functions are generally supported by a MAC sublayer in the UE:

mapping between logical channels and transport channels;
multiplexing of MAC SDUs from one or different logical channels onto transport blocks (TB) to be delivered to the physical layer on transport channels;
demultiplexing of MAC SDUs from one or different logical channels from transport blocks (TB) delivered from the physical layer on transport channels;
scheduling information reporting;
error correction through HARQ;
Logical Channel prioritization;
radio resource selection for SL.

As apparent from FIG. 3, the MAC entity correspondingly comprises further entities (functions), such as the Hybrid ARQ (HARQ) entity, multiplexing and demultiplexing entities, a Logical Channel Prioritization entity (for uplink only), and a controller which performs various control functions for the MAC entity. The MAC entities/functions are defined in detail in TS 36.321, current version 12.6.0, e.g. section 5 "MAC procedure", incorporated herein by reference in its entirety.

The HARQ entity (see subclause 5.3.2 of TS 36.321, incorporated herein by reference) is responsible for the transmit and receive HARQ operations. The transmit HARQ operation includes transmission and retransmission of transport blocks, and reception and processing of ACK/NACK signaling. The receive HARQ operation includes reception of transport blocks, combining of the received data, and generation of ACK/NACK signaling. In order to enable continuous transmission while previous transport blocks are being decoded, up to 8 HARQ processes in parallel are used to support multi-process operation.

In the multiplexing and demultiplexing entity, data from several logical channels can be (de)-multiplexed into/from one transport channel. The multiplexing entity generates MAC PDUs from MAC SDUs when radio resources are available for a new transmission; this process includes prioritizing the data from the logical channels to decide how much data and from which logical channels should be included in each MAC PDU.

The random access procedure is used when a UE is not allocated with uplink radio resources but has data to transmit, or when the UE is not time synchronized in the uplink direction. Details of the RACH procedure are defined in TS 36.321, subclause 5.1, incorporated herein by reference.

The controller entity is responsible for a number of functions, inter alia including discontinuous reception (DRX), the random access channel (RACH) procedure, the data scheduling procedure and maintaining the uplink timing alignment.

The MAC layer provides a data transfer service (see subclauses 5.4 and 5.3 of TS 36.321 incorporated herein by reference) for the RLC layer through logical channels, which are either control logical channels which carry control data (e.g. RRC signaling) or traffic logical channels which carry user plane data. The following control logical channels, as illustrated in FIG. 3, are defined: broadcast control channel (BCCH), paging control channel (PCCH), common control channel (CCCH), multicast control channel (MCCH), and dedicated control channel (DCCH). The traffic logical channels are the dedicated traffic channel (DTCH) and the multicast traffic channel (MTCH).

The logical channels are associated with one out of four different Logical Channel Groups (LCGs) with the LCG IDs 0-3, e.g. for the purpose of buffer status reporting, as will be explained in detail later.

On the other hand, the data from the MAC layer is exchanged with the physical layer through transport channels, which are classified as downlink or uplink. Data is multiplexed into transport channels depending on how it is transmitted over the air. The following downlink transport channels are defined: broadcast channel (BCH), downlink shared channel (DL-SCH), paging channel (PCH), and multicast channel (MCH). The following uplink transport channels are defined: uplink shared channel (UL-SCH) and random access channel (RACH). Further information regarding the logical channels and the transport channels and their mapping in between can be found in the 3GPP technical standard 36.321, current version 12.6.0 in clause 4.5 "Channel Structure", incorporated in its entirety herein by reference.

The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signalling Radio Bearer (SRBs) and of radio bearers carrying user data (Data Radio Bearers, DRBs).

Dedicated RRC messages are transferred across Signalling Radio Bearers, which are mapped via the PDCP and RLC layers onto logical channels—either the Common Control Channel (CCCH) during connection establishment or a Dedicated Control Channel (DCCH) in RRC_CONNECTED. System information and paging messages are mapped directly to logical channels, the Broadcast Control Channel (BCCH) and Paging Control Channel (PCCH) respectively.

In a mobile network using the Long Term Evolution (LTE) architecture, bearers are the "tunnels" used to connect the user equipment to Packet Data Networks (PDNs) such as the Internet. In LTE Network, QoS is implemented between UE and PDN Gateway and is applied to a set of bearers. 'Bearer' is basically a virtual concept and a set of network configuration to provide special treatment to a set of traffic, e.g. VoIP packets are prioritized by the network compared to web-browser traffic. Essentially, each stream of different characteristics (e.g. delay, delivery time, throughput, SNR, error-rate jitter etc.) is mapped to different bearers. Thus, a bearer is a unit of QoS control, and one bearer is used to fulfill one set of QoS requirements. In LTE, QoS is applied on the radio bearer, the S1 bearer and the S5/S8 bearer, collectively called an EPS bearer as shown in FIG. 4. FIG. 4 also illustrates the sidelink radio bearer between a relay UE and the remote UE served by the relay UE (see later sections for information on ProSe sidelink).

In an LTE mobile network, one default bearer is established to a default P-GW whenever the user equipment device is activated (this means the user equipment is on and has performed authentication). There must be at least one default bearer to one default P-GW, but up to 11 other bearers to the same or other P-GWs can be active to a single user equipment device. Bearers encapsulate user data with the GPRS tunneling protocol, user plane (GTP-U). The GTP-U information is in turn sent with UDP and inside IP packets. Every user equipment device has an "always on" default bearer for each P-GW to which it connects. For example, if user equipment connects to the Internet through one P-GW and a corporate intranet through another P-GW, two default bearers will be active. In addition, the user equipment can establish other dedicated bearers to other PDNs, based on quality-of-service (QoS) requirements. For instance, viewing a streaming video over the Internet could be done over a dedicated bearer. Dedicated bearers can use a bandwidth guarantee (a guaranteed bit rate, or GBR) or the user equipment can establish a non-GBR bearer.

There are two types of radio bearers in LTE: signaling radio bearers (SRB) which carrier control signaling, e.g. RRC signaling/NAS information (there are types of SRB in LTE: SRB0, SRB1 and SRB2), and data radio bearer (DRBs) which carry user plane traffic/data. A UE supports up to 8 DRBs.

The EPS bearer itself is a concatenated tunnel consisting of three portions (in a non-roaming situation), established in the following order:

The S5 bearer—This tunnel connects the Serving Gateway (S-GW) to the P-GW. (The tunnel can extend from P-GW to PDN service network, but this is not considered here.)

The S1 bearer—This tunnel connects the evolved NodeB (eNodeB or eNB) radio cell with the S-GW. Handover establishes a new S1 bearer for end-to-end connectivity.

The radio bearer—This tunnel connects the user equipment to the eNodeB (eNB). This bearer follows the mobile user under the direction of the Mobile Management Entity (MME) as the radio network performs handovers when the user moves from one cell to another.

For all different types of bearers listed above, there is a one-to-one mapping relationship. In other words, there is a unique match between an EPS bearer and an E-RAB, between an E-RAB and a radio bearer, and between a radio bearer and an S1 bearer.

Each bearer uses a set of QoS parameters to describe the properties of the transporting channel, such as bit rates, packet delay, packet loss, bit error rate and scheduling policy. The four key parameters are outlined here.

QoS class indicator (QCI): The QCI basically defines a unique expected treatment of a bearer and is intended to provide similar handling of bearers of the same QCI even if network nodes are developed by different vendors. Based on the received QCI value, each network node knows how to treat the corresponding associated bearer, i.e. a QCI value is associated to a bearer. The list of current defined QCI values can be found in 3GPP TS23.203, current version 13.4.0, section 6.1.7.

Allocation and retention priority (ARP): ARP specifies the forwarding treatment for the control-plane traffic that the bearers receive. ARP enables bearer establishment and modification, as well as connection setup and release. For example, ARP can be used by the EPS to decide which bearer should be released during resource limitations or traffic congestion.

Maximum bit rate (MBR): MBR is applicable only for real-time services and is defined for GBR bearers. MBR is the bit rate that the traffic on the bearer may not exceed.

Guaranteed bit rate (GBR): GBR specifies the bit rate that the network guarantees (e.g. through the use of an admission control function) for that bearer. In 3GPP Release 8 and beyond, the MBR must be set equal to the GBR; that is, the guaranteed rate is also the maximum rate that is allowed by the system.

Uplink/Downlink Scheduling

A MAC function in the eNodeB refers to scheduling, by which the eNB distributes the available radio resources in one cell among the UEs and among the radio bearers for each UE. In principle, the eNodeB allocates the downlink and uplink resources to each UE based on respectively the downlink data buffered in the eNodeB and based on buffer status reports (BSRs) received from the UE. In this process, the eNodeB considers the QoS requirements of each configured radio bearer and selects the size of the MAC PDU.

The usual mode of scheduling is dynamic scheduling, by means of downlink grant/assignment messages (DCIs) for the allocation of downlink transmission resources and uplink grant/assignment messages for the allocation of uplink transmission resources. They are transmitted on the physical downlink control channel (PDCCH) using a cell radio network temporary identifier (C-RNTI) to identify the intended UE. In addition to the dynamic scheduling, persistent scheduling is defined, which enables radio resources to be semi-statically configured and allocated to a UE for a longer time period than one subframe, thus avoiding the need for specific downlink assignment messages or uplink grant messages over the PDCCH for each subframe. For the configuration or reconfiguration of a persistent schedule, RRC signaling indicates the resource allocation interval at which the radio resources are periodically assigned. When the PDCCH is used to configure or reconfigure a persistent schedule, it is necessary to distinguish the scheduling messages which apply to a persistent schedule from those used for dynamic scheduling. For this purpose, a special scheduling identity is used, known as the semi-persistent scheduling C-RNTI, SPS-C-RNTI, which for each UE is different from the C-RNTI used for dynamic scheduling messages.

In order to inform the scheduled users about their allocation status, transport format and other transmission-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even be dynamic for each user. Generally, the L1/2 control signaling needs only to be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

Downlink control information occurs in several formats that differ in overall size and also in the information contained in their fields. The different DCI formats that are currently defined for LTE are described in detail in 3GPP TS 36.212, "Multiplexing and channel coding", section 5.3.3.1 (current version v12.5.0 available at http://www.3gpp.org and incorporated herein by reference). For detailed information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference.

Additional formats may be defined in the future.

Logical Channel Prioritization, LCP, Procedure

For the uplink, the process by which a UE creates a MAC PDU to be transmitted using the allocated radio resources is fully standardized; the LCP procedure is designed to ensure that the UE satisfies the QoS of each configured radio bearer in a way which is optimal and consistent between different UE implementations. Based on the uplink transmission resource grant message signalled on the PDCCH, the UE has to decide on the amount of data for each logical channel to be included in the new MAC PDU and, if necessary, also to allocate space for a MAC Control Element.

In constructing a MAC PDU with data from multiple logical channels, the simplest and most intuitive method is the absolute priority-based method, where the MAC PDU space is allocated to logical channels in decreasing order of logical channel priority. This is, data from the highest priority logical channel is served first in the MAC PDU, followed by data from the next highest priority logical channel, continuing until the MAC PDU space runs out. Although the absolute priority-based method is quite simple in terms of UE implementation, it sometimes leads to starvation of data from low-priority logical channels. Starvation means that the data from the low-priority logical channels cannot be transmitted because the data from high-priority logical channels take up all the MAC PDU space.

In LTE, a Prioritized Bit Rate (PBR) is defined for each logical channel, in order to transmit data in order of importance but also to avoid starvation of data with lower priority. The PBR is the minimum data rate guaranteed for the logical channel. Even if the logical channel has low priority, at least a small amount of MAC PDU space is allocated to guarantee the PBR. Thus, the starvation problem can be avoided by using the PBR.

Constructing a MAC PDU with PBR consists of two rounds. In the first round, each logical channel is served in decreasing order of logical channel priority, but the amount of data from each logical channel included in the MAC PDU is initially limited to the amount corresponding to the configured PBR value of the logical channel. After all logical channels have been served up to their PBR values, if there is room left in the MAC PDU, the second round is performed. In the second round, each logical channel is served again in decreasing order of priority. The major difference for the second round compared to the first round is that each logical channel of lower priority can be allocated with MAC PDU space only if all logical channels of higher priority have no more data to transmit.

A MAC PDU may include not only the MAC SDUs from each configured logical channel but also a MAC CE. Except for a Padding BSR, the MAC CE has a higher priority than a MAC SDU from the logical channels because it controls the operation of the MAC layer. Thus, when a MAC PDU is composed, the MAC CE, if it exists, is the first to be included, and the remaining space is used for MAC SDUs from the logical channels. Then, if additional space is left and it is large enough to include a BSR, a Padding BSR is triggered and included in the MAC PDU.

The Logical Channel Prioritization is standardized e.g. in 3GPP TS 36.321, current version v12.6.0, in subclause 5.4.3.1 incorporated herein by reference.

The Logical Channel Prioritization (LCP) procedure is applied when a new transmission is performed.

RRC controls the scheduling of uplink data by signalling for each logical channel:
priority where an increasing priority value indicates a lower priority level,
prioritisedBitRate which sets the Prioritized Bit Rate (PBR),
bucketSizeDuration which sets the Bucket Size Duration (BSD).

The UE shall maintain a variable $Bj$ for each logical channel j. $Bj$ shall be initialized to zero when the related logical channel is established, and incremented by the product PBR×TTI duration for each TTI, where PBR is Prioritized Bit Rate of logical channel j. However, the value of $Bj$ can never exceed the bucket size, and if the value of $Bj$ is larger than the bucket size of logical channel j, it shall be set to the bucket size. The bucket size of a logical channel is equal to PBR×BSD, where PBR and BSD are configured by upper layers.

The UE (MAC entity) shall perform the following Logical Channel Prioritization procedure when a new transmission is performed:

The UE (MAC entity) shall allocate resources to the logical channels in the following steps:

Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);

Step 2: the UE (MAC entity) shall decrement Bj by the total size of MAC SDUs served to logical channel j in Step 1

NOTE: The value of Bj can be negative.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE (MAC entity) shall also follow the rules below during the scheduling procedures above:

The UE (MAC entity) should not segment an RLC SDU (or partially transmitted SDU or retransmitted RLC PDU) if the whole SDU (or partially transmitted SDU or retransmitted RLC PDU) fits into the remaining resources;

if the UE (MAC entity) segments an RLC SDU from the logical channel, it shall maximize the size of the segment to fill the grant as much as possible;

the UE (MAC entity) should maximize the transmission of data.

if the UE (MAC entity) is given an UL grant size that is equal to or larger than 4 bytes while having data available for transmission, the UE (MAC entity) shall not transmit only padding BSR and/or padding (unless the UL grant size is less than 7 bytes and an AMD PDU segment needs to be transmitted).

The UE shall not transmit data for a logical channel corresponding to a radio bearer that is suspended (the conditions for when a radio bearer is considered suspended are defined in TS 36.331).

For the Logical Channel Prioritization procedure, the UE shall take into account the following relative priority in decreasing order:

MAC control element for C-RNTI or data from UL-CCCH;
MAC control element for BSR, with exception of BSR included for padding;
MAC control element for PHR or Extended PHR, or Dual Connectivity PHR;
data from any Logical Channel, except data from UL-CCCH;
MAC control element for BSR included for padding.

When the UE is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when the UE is requested to transmit multiple MAC PDUs in one TTI.

Buffer Status Reporting

As mentioned before, a mode of scheduling is dynamic scheduling Buffer status reports (BSR) from the UE to the eNodeB are used to assist the eNodeB in allocating uplink resources, i.e. uplink scheduling. For the downlink case, the eNB scheduler is obviously aware of the amount of data to be delivered to each UE; however, for the uplink direction, since scheduling decisions are done at the eNB and the buffer for the data is in the UE, BSRs have to be sent from the UE to the eNB in order to indicate the amount of data that needs to be transmitted over the UL-SCH.

Buffer Status Report MAC control elements for LTE consist of either: a long BSR (with four buffer size fields corresponding to the four LCG IDs #0-3) or a short BSR (with one LCG ID field and one corresponding buffer size field). The buffer size field indicates the total amount of data available across all logical channels of a logical channel group and is indicated in number of bytes encoded as an index of different buffer size levels (see also 3GPP TS 36.321, current version 12.6.0, subclause 6.1.3.1, incorporated herewith by reference).

Which one of either the short or the long BSR is transmitted by the UE depends on the available transmission resources in a transport block, on how many groups of logical channels have non-empty buffers and on whether a specific event is triggered at the UE. The long BSR reports the amount of data for the four defined logical channel groups (i.e. LCG ID 0-3), whereas the short BSR indicates the amount of data buffered for only the highest logical channel group.

The reason for introducing the logical channel group concept is that even though the UE may have more than four logical channels configured, reporting the buffer status for each individual logical channel would cause too much signaling overhead. Therefore, the eNB assigns each logical channel to a logical channel group; preferably, logical channels with same/similar QoS requirements should be allocated within the same logical channel group.

In order to be robust against transmission failures, there is a BSR retransmission mechanism defined for LTE; the retransmission BSR timer is started or restarted whenever an uplink grant is received; if no uplink grant is received before the retransmission BSR timer expires, another BSR is triggered in the UE.

A BSR is triggered for events, such as:
Whenever data arrives for a logical channel, which has a higher priority than the logical channels whose buffer are non-empty (i.e. whose buffer previously contained data);
Whenever data becomes available for any logical channel, when there was previously no data available for transmission (i.e. all buffers previously empty)
Whenever the retransmission BSR time expires
Whenever periodic BSR reporting is due, i.e. periodicBSR timer expires
Whenever there is a spare space in a transport block which can accommodate a BSR More detailed information with regard to BSR and in particular the triggering of same is explained in 3GPP TS 36.321 v12.6.0 in subclause 5.4.5 incorporated herein by reference.

If the UE has no uplink resources allocated for including a BSR in the transport block when a BSR is triggered, the UE sends a scheduling request (SR) to the eNodeB so as to be allocated with uplink resources to transmit the BSR. Either a single-bit scheduling request is sent over the PUCCH (dedicated scheduling request, D-SR), or the random access procedure (RACH) is performed to request an allocation of an uplink radio resource for sending a BSR.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the present disclosure the terms "D2D", "ProSe" and "sidelink" are interchangeable.

D2D Communication in LTE

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface and will be described in more detail later.

In D2D communication, UEs transmit data signals to each other over a direct link using the cellular resources instead of through the base station (BS). D2D users communicate directly while remaining controlled under the BS, i.e. at least when being in coverage of an eNB. Therefore, D2D can improve system performances by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e. no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

With respect to the user plane protocols, part of the agreement for the MAC from D2D communication perspective is given in the following (see for further details also 3GPP TR 36.843 current version 12.0.1 section 9.2.2, incorporated herein by reference):—MAC:

No HARQ feedback is assumed for 1:M D2D broadcast communication

The receiving UE needs to know a source ID in order to identify the receiver RLC UM entity.

The MAC header comprises a L2 target ID which allows filtering out packets at MAC layer.

The L2 target ID may be a broadcast, group cast or unicast address.

L2 Groupcast/Unicast: A L2 target ID carried in the MAC header would allow discarding a received RLC UM PDU even before delivering it to the RLC receiver entity.

L2 Broadcast: A receiving UE would process all received RLC PDUs from all transmitters and aim to re-assemble and deliver IP packets to upper layers.

MAC sub header contains LCIDs (to differentiate multiple logical channels).

At least Multiplexing/de-multiplexing, priority handling and padding are useful for D2D.

ProSe Direct Communication Layer-2 Link

In brief, ProSe direct one-to-one communication is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g. self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v1.4.0 section 7.1.2 incorporated herein by reference:

Establishment of a secure layer-2 link over PC5.

IP address/prefix assignment.

Layer-2 link maintenance over PC5.

Layer-2 link release over PC5.

FIG. 5 discloses how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.

2. UE-2 initiates the procedure for mutual authentication. The successful completion of the authentication procedure completes the establishment of the secure layer-2 link over PC5.

The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related Identities

3GPP TS 36.300, current version 13.0.0, defines in subclause 8.3 the following identities to use for ProSe Direct Communication:

SL-RNTI: Unique identification used for ProSe Direct Communication Scheduling;

Source Layer-2 ID: Identifies the sender of the data in sidelink ProSe Direct Communication. The Source Layer-2 ID is 24 bits long and is used together with ProSe Layer-2 Destination ID and LCID for identification of the RLC UM entity and PDCP entity in the receiver;

Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.

Second bit string is the MSB part (16 bits) of the Destination Layer-2 ID and is carried within the MAC header. This is used for filtering packets at the MAC layer.

No Access Stratum signalling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer.

Radio Resource Allocation for Proximity Services

From the perspective of a transmitting UE, a Proximity-Services-enabled UE (ProSe-enabled UE) can operate in two modes for resource allocation: Mode 1 refers to the eNB-scheduled resource allocation, where the UE requests transmission resources from the eNB (or Release-10 relay node), and the eNodeB (or Release-10 relay node) in turn schedules the resources used by a UE to transmit direct data and direct control information (e.g. Scheduling Assignment). The UE needs to be RRC_CONNECTED in order to transmit data. In particular, the UE sends a scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection, where a UE on its own selects resources (time and frequency) from resource pool(s) to transmit direct data and direct control information (i.e. SA). One resource pool is defined e.g. by the content of SIB18, namely by the field commTxPoolNormalCommon, this particular resource pool being broadcast in the cell and then commonly available for all UEs in the cell still in RRC_Idle state. Effectively, the eNB may define up to four different instances of said pool, respectively four resource pools for the transmission of SA messages and direct data. However, a UE shall always use the first resource pool defined in the list, even if it was configured with multiple resource pools according to the current release, i.e. Rel.-12.

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e. RRC_IDLE or RRC_CONNECTED, and the coverage state of the UE, i.e. in-coverage, out-of-coverage. A UE is considered in-coverage if it has a serving cell (i.e. the UE is RRC_CONNECTED or is camping on a cell in RRC_IDLE).

FIG. 6 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 6 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 6 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e. resource pool) are provided; this may be done e.g. with the exchange of the D2D communication Interest Indication by the UE and the corresponding response, D2D Communication Response, where the corresponding exemplary ProSeCommConfig information element mentioned above would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;
Step 2: eNB grants UL resource (for UE to send BSR) via PDCCH, scrambled by C-RNTI;
Step 3: UE sends D2D BSR indicating the buffer status via PUSCH;
Step 4: eNB grants D2D resource (for UE to send data) via PDCCH, scrambled by D2D-RNTI.
Step 5: D2D Tx UE transmits SA/D2D data according to grant received in step 4.

A Scheduling Assignment (SA), also termed SCI (Sidelink Control Information) is a compact (low-payload) message containing control information, e.g. pointer(s) to time-frequency resources, modulation and coding scheme and Group Destination ID for the corresponding D2D data transmission. An SCI transports the sidelink scheduling information for one (ProSE) destination ID. The content of the SA (SCI) is basically in accordance with the grant received in Step 4 above. The D2D grant and SA content (i.e. SCI content) are defined in the 3GPP technical standard 36.212, current version 12.5.0, subclause 5.4.3, incorporated herein by reference, defining in particular the SCI format 0.

On the other hand, for Mode 2 resource allocation, above steps 1-4 are basically not necessary, and the UE autonomously selects resources for the SA and D2D data transmission from the transmission resource pool(s) configured and provided by the eNB.

FIG. 7 exemplarily illustrates the transmission of the Scheduling Assignment and the D2D data for two UEs, UE-A and UE-B, where the resources for sending the scheduling assignments are periodic, and the resources used for the D2D data transmission are indicated by the corresponding Scheduling Assignment.

ProSe Network Architecture and ProSe Entities

FIG. 8 illustrates a high-level exemplary architecture for a non-roaming case, including different ProSe applications in the respective UEs A and B, as well as a ProSe Application Server and ProSe function in the network. The example architecture of FIG. 8 is taken from TS 23.303 v.13.0.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling etc. related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication. The term "UE" used in said connection refers to a ProSe-enabled UE supporting ProSe functionality.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

UE Coverage States for D2D

As already mentioned before, the resource allocation method for D2D communication depends apart from the RRC state, i.e. RRC_IDLE and RRC_CONNECTED, also on the coverage state of the UE, i.e. in-coverage, out-of-coverage. A UE is considered in-coverage if it has a serving cell (i.e. the UE is RRC_CONNECTED or is camping on a cell in RRC_IDLE).

The two coverage states mentioned so far, i.e. in-coverage (IC) and out-of-coverage (OOC), are further distinguished into sub-states for D2D. FIG. 9 shows the four different states a D2D UE can be associated to, which can be summarized as follows:

State 1: UE1 has uplink and downlink coverage. In this state the network controls each D2D communication session. Furthermore, the network configures whether UE1 should use resource allocation Mode 1 or Mode 2.

State 2: UE2 has downlink but no uplink coverage, i.e. only DL coverage. The network broadcasts a (contention-based) resource pool. In this state the transmitting UE selects the resources used for SA and data from a resource pool configured by the network; resource allocation is only possible according to Mode 2 for D2D communication in such a state.

State 3: Since UE3 has no uplink and downlink coverage, the UE3 is, strictly speaking, already considered as out-of-coverage (OOC). However, UE3 is in the coverage of some UEs which are themselves (e.g. UE1) in the coverage of the cell, i.e. those UEs can be also referred as CP-relay UEs or simply relay UEs (see also later chapters on ProSe relay). Therefore, the area of the state-3 UEs in FIG. 9 can be denoted as CP UE-relay coverage area. UEs in this state 3 are also referred to as OOC-state-3 UEs. In this state the UEs may receive some cell-specific information which is sent by the eNB (SIB) and forwarded by the CP UE-relay UEs in the coverage of the cell via PD2DSCH to the OOC-state-3 UEs. A (contention-based) network-controlled resource pool is signalled by PD2DSCH.

State 4: UE4 is out of coverage and does not receive PD2DSCH from other UEs which are in the coverage of a cell. In this state, which is also referred to as state-4 OOC, the transmitting UE selects the resources used for the data transmission from a pre-configured pool of resources.

The reason to distinguish between state-3 OOC and state-4 OOC is mainly to avoid potentially strong interference between D2D transmissions from out-of coverage devices and legacy E-UTRA transmissions. In general, D2D-capable UEs will have preconfigured resource pool(s) for transmission of D2D SAs and data for use while out of coverage. If these out-of-coverage UEs transmit on these preconfigured resource pools near cell boundaries, then, interference between the D2D transmissions and in-coverage legacy transmissions could have a negative impact on communications within the cell. If D2D-enabled UEs within coverage forwarded the D2D resource pool configuration to those out-of-coverage devices near the cell boundary, then, the out-of-coverage UEs could restrict their transmissions to the resources specified by the eNode B and therefore minimize interference with legacy transmissions in coverage. Thus, RAN1 introduced a mechanism where in-coverage UEs are forwarding resource pool information and other D2D related configurations to those devices just outside the coverage area (state-3 UEs).

The Physical D2D synchronization channel (PD2DSCH) is used to carry this information about in-coverage D2D resource pools to the UEs in network proximity, so that resource pools within network proximity are aligned.

D2D Discovery—Models and Resource Allocation

ProSe Direct Discovery is defined as the procedure used by the ProSe-enabled UE to discover other ProSe-enabled UE(s) in its proximity using E-UTRA direct radio signals via PC5. Upper layer handles authorization for announcement and monitoring of discovery information. For this purpose, UEs have to exchange predefined signals, referred to as "discovery signals". By checking discovery signals periodically, a UE maintains a list of proximity UEs in order to establish a communication link when needed. Discovery signals should be detected reliably, even in low Signal-to-Noise Ratio (SNR) environments. To allow discovery signals to be transmitted periodically, resources for Discovery signals should be assigned.

There are two types of ProSe Direct Discovery: open and restricted. Open is the case where there is no explicit permission that is needed from the UE being discovered, whereas restricted discovery only takes place with explicit permission from the UE that is being discovered.

ProSe Direct Discovery can be a standalone service enabler that could for example use information from the discovered UE for certain applications in the UE that are permitted to use this information e.g. "find a taxi nearby", "find me a coffee shop". Additionally depending on the information obtained, ProSe Direct Discovery can be used for subsequent actions e.g. to initiate ProSe Direct Communication.

The following models for ProSe Direct Discovery are defined in the standard 3GPP TS 23.303, current version 13.0.0, section 5.3 and all subsections thereof, incorporated herein by reference.

Model A ("I Am Here")

This model defines two roles for the ProSe-enabled UEs that are participating in ProSe Direct Discovery.

Announcing UE: The UE announces certain information that could be used by UEs in proximity that have permission to discover.

Monitoring UE: The UE that monitors certain information of interest in proximity of announcing UEs.

In this model the announcing UE broadcasts discovery messages at pre-defined discovery intervals and the monitoring UEs that are interested in these messages read them and process them. This model may be referred to as "I am here" since the announcing UE would broadcast information about itself e.g. its ProSe Application Code in the discovery message.

Model B ("Who is There?"/"Are You There?")

This model defines two roles for the ProSe-enabled UEs that are participating in ProSe Direct Discovery.

Discoverer UE: The UE transmits a request containing certain information about what it is interested to discover.

Discoveree UE: The UE that receives the request message can respond with some information related to the discoverers request.

It can be referred to as "who is there/are you there" since the discoverer UE sends information for other UEs that would like to receive responses, e.g. the information can be about a ProSe Application Identity corresponding to a group and the members of the group can respond.

The content of the discovery information is transparent to the Access Stratum (AS), and no distinction is made in the AS for ProSe Direct Discovery models and types of ProSe Direct Discovery. The ProSe Protocol ensures that it delivers only valid discovery information to AS for announcement.

The UE can participate in announcing and monitoring of discovery information in both RRC_IDLE and RRC_CONNECTED state as per eNB configuration. The UE announces and monitors its discovery information subject to the half-duplex constraints.

Generally, device discovery is needed periodically. Further, D2D devices utilize a discovery message signaling protocol to perform device discovery. For example, a D2D-enabled UE can transmit its discovery message, and another D2D-enabled UE receives this discovery message and can use the information to establish a direct communication link. An advantage of a hybrid network is that if D2D devices are also in communication range of network infrastructure, network entities, like eNB, can additionally assist in the transmission or configuration of discovery messages. Coordination/control by the eNB in the transmission or configuration of discovery messages is also important to ensure that D2D messaging does not create interference with the cellular traffic controlled by the eNB. Additionally, even if some of the devices are outside of the network coverage range, in-coverage devices can assist in the ad-hoc discovery protocol.

At least the following two types of discovery procedure are defined for the purpose of terminology definition used further in the description.

UE autonomous resource selection (called Type 1 subsequently): A resource allocation procedure where resources for announcing discovery information are allocated on a non UE specific basis, further characterized by:

The eNB provides the UE(s) with the resource pool configuration used for announcing of discovery information. The configuration may be e.g. signalled in SIB.

The UE autonomously selects radio resource(s) from the indicated resource pool and announces discovery information.

The UE can announce discovery information on a randomly selected discovery resource during each discovery period.

Scheduled resource allocation (called Type 2 subsequently):

A resource allocation procedure where resources for announcing discovery information are allocated on a per-UE-specific basis, further characterized by:

The UE in RRC_CONNECTED may request resource(s) for announcing of discovery information from the eNB via RRC. The eNB assigns resource(s) via RRC.

The resources are allocated within the resource pool that is configured in UEs for monitoring.

For UEs in RRC_IDLE the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED:

A UE authorized to perform ProSe Direct Discovery announcement indicates to the eNB that it wants to perform D2D discovery announcement The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signalling (or no resource).

The resources allocated by the eNB are valid until a) the eNB de-configures the resource(s) by RRC signaling or b) the UE enters IDLE.

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

LCP Procedure for D2D, Sidelink Logical Channels

The LCP procedure for D2D will be different than the above-presented LCP procedure for "normal" LTE data. The following information is taken from TS 36.321, current version 12.6.0, subclause 5.14.1.3.1 describing LCP for ProSe; it is incorporated herewith in its entirety by reference.

All D2D (sidelink) logical channels, e.g. STCH, Sidelink Traffic CHannel, are allocated to the same logical channel group (LCG) with LCGID set to '11' (see subclause 5.14.1.4 "Buffer Status Reporting" of TS 36.321 version 12.6.0). In Rel-12 there is no prioritization mechanism for D2D (sidelink) logical channels/groups. Essentially, all sidelink logical channels have the same priority from UE point of view, i.e. the order by which the sidelink logical channels are served is left for UE implementation.

Buffer Status Reporting for ProSe

The buffer status reporting is adapted to ProSe, and at present is defined in TS 36.321 in its version 12.6.0, subclause 5.14.1.4 "Buffer Status Reporting" incorporated herein by reference.

The (D2D) sidelink Buffer Status Reporting procedure is used to provide the serving eNB with information about the amount of sidelink data in the sidelink buffers of the UE available for transmission to the other UE. RRC controls sidelink BSR reporting by configuring the two timers Periodic-ProseBSR-Timer and RetxProseBSR-Timer. Each sidelink logical channel (STCH) is allocated to an LCG with LCGID set to "11" and belongs to a ProSe Destination group.

A sidelink Buffer Status Report (BSR) shall be triggered if some particular events occur, as specified in detail in TS 36.321, subclause 5.14.1.4.

Furthermore, TS 36.321 in its version 12.6.0, subclause 6.1.3.1a, incorporated herein by reference, defines the ProSe BSR MAC Control Elements and its corresponding content as follows. The ProSe Buffer Status Report (BSR) MAC control element consists of one group index field, one LCG ID field and one corresponding Buffer Size field per reported D2D destination group. More in detail, for each included ProSe destination group, the following fields are defined:

Group index: The group index field identifies the ProSe destination group. The length of this field is 4 bits. The value is set to the index of the destination identity reported in destinationInfoList;

LCG ID: The Logical Channel Group ID field identifies the group of logical channel(s) which buffer status is being reported. The length of the field is 2 bits and it is set to "11";

Buffer Size: The Buffer Size field identifies the total amount of data available across all logical channels of a ProSe Destination group after all MAC PDUs for the TTI have been built. The amount of data is indicated in number of bytes;

R: Reserved bit, set to "0".

FIG. 10 shows the ProSe BSR MAC control element for even N (number of ProSe destination groups), taken from TS 36.321 subclause 6.1.3.1a.

ProSe UE-to-Network Relay

A UE may also support the functionality and procedure(s) so as to act as a ProSe UE-to-Network Relay, such that a Remote UE communicates with the ProSe UE-to-Network Relay over the PC5 reference point. ProSe UE-to-Network Relay operation will be specified within 3GPP Release 13. So far, only initial agreements have been made in the 3GPP RAN working groups, some of which can be seen e.g. from 3GPP TS 23.303 current version 13.0.0 and TR 23.713 current version 1.4.0, incorporated herein by reference. Some of those agreements will be listed below. It should however be noted that this work item has been introduced very recently and thus is still in the process of standardization. Consequently, any agreements assumed in the following can still be changed or reversed, and the following agreements, which are assumed for discussion purposes, shall however not be understood as limiting the present disclosure to this particular 3GPP implementation at this very early stage of standardization.

For the ProSe UE-to-Network Relay discovery and ProSe relay (re)selection both scenarios where Remote UEs are in-coverage and out-of-coverage can be addressed.

Relay UE will always be in-coverage. The eNB at the radio level can control whether the UE can act as a relay, whereas whether the network control is per relay UE, per cell (broadcast configuration), or both, or something else is still undecided.

When Remote UE is in-coverage for relay discovery purposes, the monitoring and transmitting resources for discovery can be provided e.g. by the eNB using the Rel-12 mechanisms (broadcast for idle mode and dedicated signalling for connected mode). The remote UE can decide when to start monitoring.

When the Remote UE is out of coverage, the monitoring and transmitting resources for discovery and communication (actual data transfer) can be provided e.g. by pre-configuration i.e. by way of specification/operator configuration (in USIM etc.) such that the UE exactly knows which resources to use.

ProSe UE-to-Network Relay (Re)Selection:

The Remote UE can take radio level measurements of the PC5 radio link quality into account for the ProSe UE-to-Network Relay selection procedure.

For the case that the Remote UE is out-of-coverage, the radio level measurements can be used by the remote UE together with other higher layer criteria to perform relay selection.

For the case that Remote UE is out-of-coverage, the criteria for reselection is based on PC5 measurements (RSRP or other RAN1 agreed measurements) and higher layer criteria. The relay reselection can be triggered by the remote UE.

For the case that the Remote UE is in-coverage, it is not yet decided whether and how these measurements (PC5 measurements) are used (e.g. the measurements can be used by the UE to perform selection similar to out-of-coverage case, or they can be reported to the eNB).

The ProSe UE-to-Network relay may use layer-3 packet forwarding. Control information between ProSe UEs can be exchanged over the PC5 reference point, e.g. for UE-to-Network Relay detection and ProSe Direct Discovery.

A ProSe-enabled UE will also support the exchange of ProSe control information between another ProSe-enabled UE and the ProSe Function over the PC3 reference point. In the ProSe UE-to-Network Relay case, the Remote UE will send this control information over the PC5 user plane to be relayed over the LTE-Uu interface toward the ProSe Function.

The ProSe UE-to-Network Relay entity provides the functionality to support connectivity to "unicast" services for Remote UEs that are not in the coverage area of an eNB, i.e. not connected to E-UTRAN. FIG. 11 shows a ProSe UE-to-Network Relay scenario. The ProSe UE-to-Network Relay shall relay unicast traffic (UL and/or DL) between the Remote UE and the network. The ProSe UE-to-Network Relay shall provide a generic function that can relay any type of traffic that is relevant for public safety communication.

One-to-one Direct Communication between Remote UEs and ProSe UE-to-Network Relays has the following characteristics:

Communication over PC5 reference point is connectionless.

ProSe Bearers are bi-directional. IP packets passed to the radio layers on a given ProSe bearer will be transmitted by the physical layer with the associated L2 destination address. IP packets passed up from the radio layers on the same ProSe bearer will have been received over the air addressed to the same L2 destination.

ProSe UE-to-Network Relaying may include the following functions:

ProSe Direct discovery following Model A or Model B can be used in order to allow the Remote UE to discover ProSe UE-to-Network Relay(s) in proximity.

ProSe Direct discovery that can be used in order to allow the Remote UE to discover L2 address of the ProSe UE-to-Network Relay to be used by the Remote UE for IP address allocation and user plane traffic corresponding to a specific PDN connection supported by the ProSe UE-to-Network Relay.

Act as an "announcing" or "discoveree" UE on the PC5 reference point supporting direct discovery.

Act as a default router to the Remote UEs forwarding IP packets between the UE-ProSe UE-to-Network Relay point-to-point link and the corresponding PDN connection.

Handle Router Solicitation and Router Advertisement messages as defined in IETF RFC 4861.
Act as DHCPv4 Server and stateless DHCPv6 Relay Agent.
Act as a NAT if IPv4 is used replacing the locally assigned IPv4 address of the Remote UE with its own.
Map the L2 link ID used by the Remote UE as Destination Layer-2 ID to the corresponding PDN connection supported by the ProSe UE-to-Network Relay.

The user plane protocol architecture for the ProSe UE-to-Network relay is shown in FIG. 12.

Both Model A and Model B discovery are supported, as discussed before for the usual Rel.-12 direct discovery between two ProSe UEs, where Model A uses a single discovery protocol message (UE-to-Network Relay Discovery Announcement) and Model B uses two discovery protocol messages (UE-to-Network Relay Discovery Solicitation and UE-to-Network Relay Discovery Response). Details on Relay Discovery can be found in section 6 of 3GPP TR 23.713 current version v1.4.0 incorporated herein by reference.

ProSe Direction Communication Via the ProSe UE-to-Network Relay

The UE-to-Network Relay function will be specified based upon an evolution of the ProSe functionality already documented in TS 23.303 as discussed before.

A ProSe UE-to-Network Relay capable UE may attach to the network (if it is not already connected) and connect to a PDN connection enabling the necessary relay traffic, or it may need to connect to additional PDN connection(s) in order to provide relay traffic toward Remote UE(s). PDN connection(s) supporting UE-to-Network Relay shall only be used for Remote ProSe UE(s) relay traffic.

As has been explained above, 3GPP introduces as a major work item the ProSe relay functionality, which includes relay discovery and relay direct communication. Some of the currently-defined mechanisms for ProSe relay are rather inefficient. Other mechanisms are not agreed at all, such as how and when a relay-capable ProSe UE actually starts acting as a relay, i.e. offering the relay service in the radio cell.

SUMMARY

One non-limiting and exemplary embodiment provides improved methods for scheduling radio resources for a relay user equipment that is serving as a relay for a remote equipment. The independent claims provide non-limiting and exemplary embodiments. Advantageous embodiments are subject to the dependent claims.

In one general aspect, the techniques disclosed here feature a method for scheduling radio resources for a relay user equipment in a mobile communication system. The relay user equipment supports a relay functionality for being capable to serve as a relay, respectively for one or more remote user equipments, such that remote data, originating from or destined to the one or more remote user equipments, is relayed by the relay user equipment between the one or more remote user equipments and a radio base station. A remote scheduling identification is configured for addressing one or more remote logical channels carrying the remote data between the relay user equipment and the radio base station. A relay scheduling identification is configured for addressing one or more relay logical channels carrying relay data, originating from or destined to the relay user equipment, between the relay user equipment and the radio base station. The method comprises the following performed by the relay user equipment. The relay UE receives, from the radio base station, a remote resource assignment, assigning radio resources to the relay user equipment for exchanging the remote data with the radio base station, where the remote resource assignment is addressed to the remote scheduling identification. The relay UE receives, from the radio base station, a relay resource assignment, assigning radio resources to the relay user equipment for exchanging the relay data with the radio base station, where the relay resource assignment is addressed to the relay scheduling identification.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 illustrates cell coverage regarding four different states the D2D UE can be associated to;

DETAILED DESCRIPTION

Figure 1:
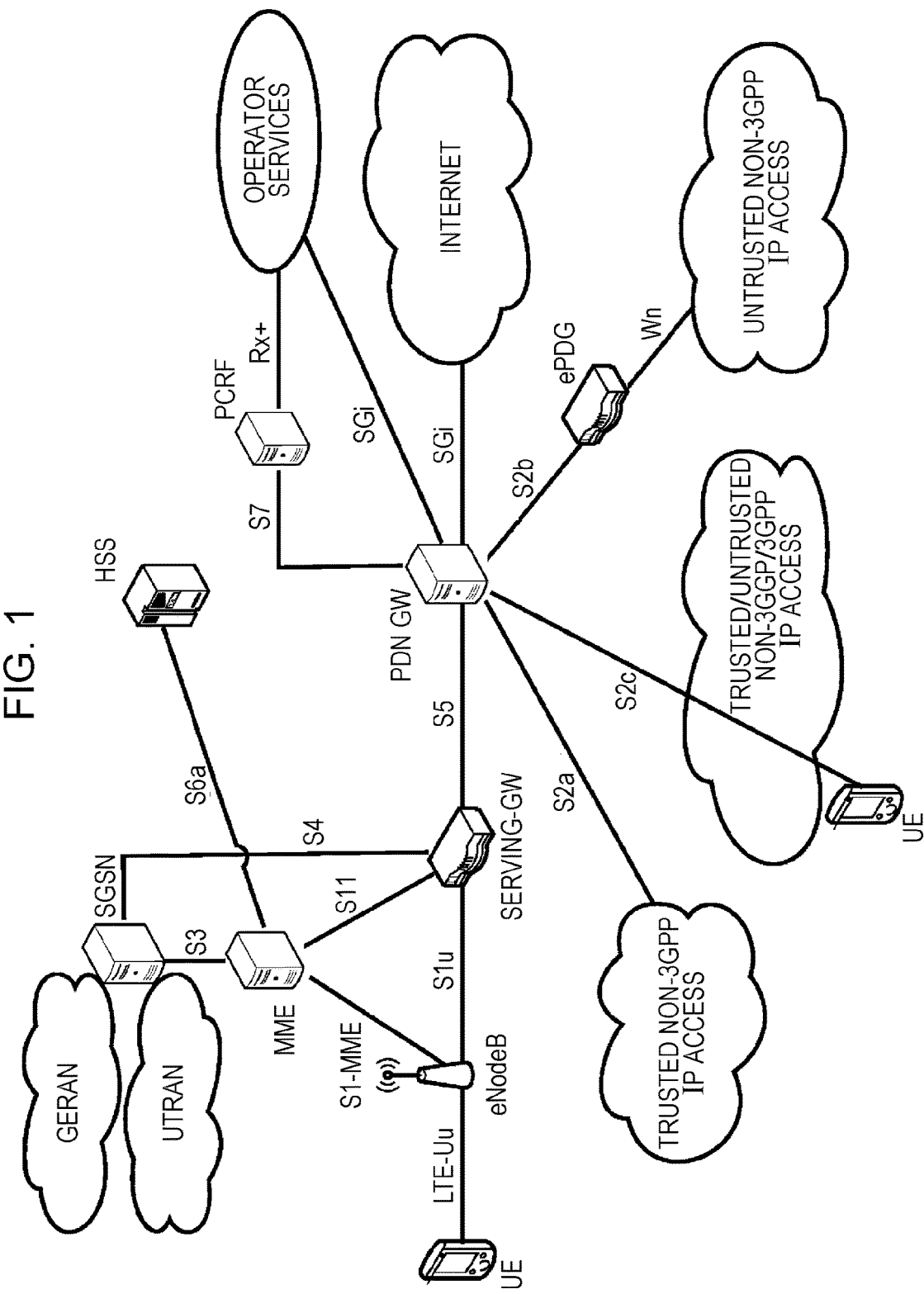
FIG. 1 shows an exemplary architecture of a 3GPP LTE system.
Figure 2:
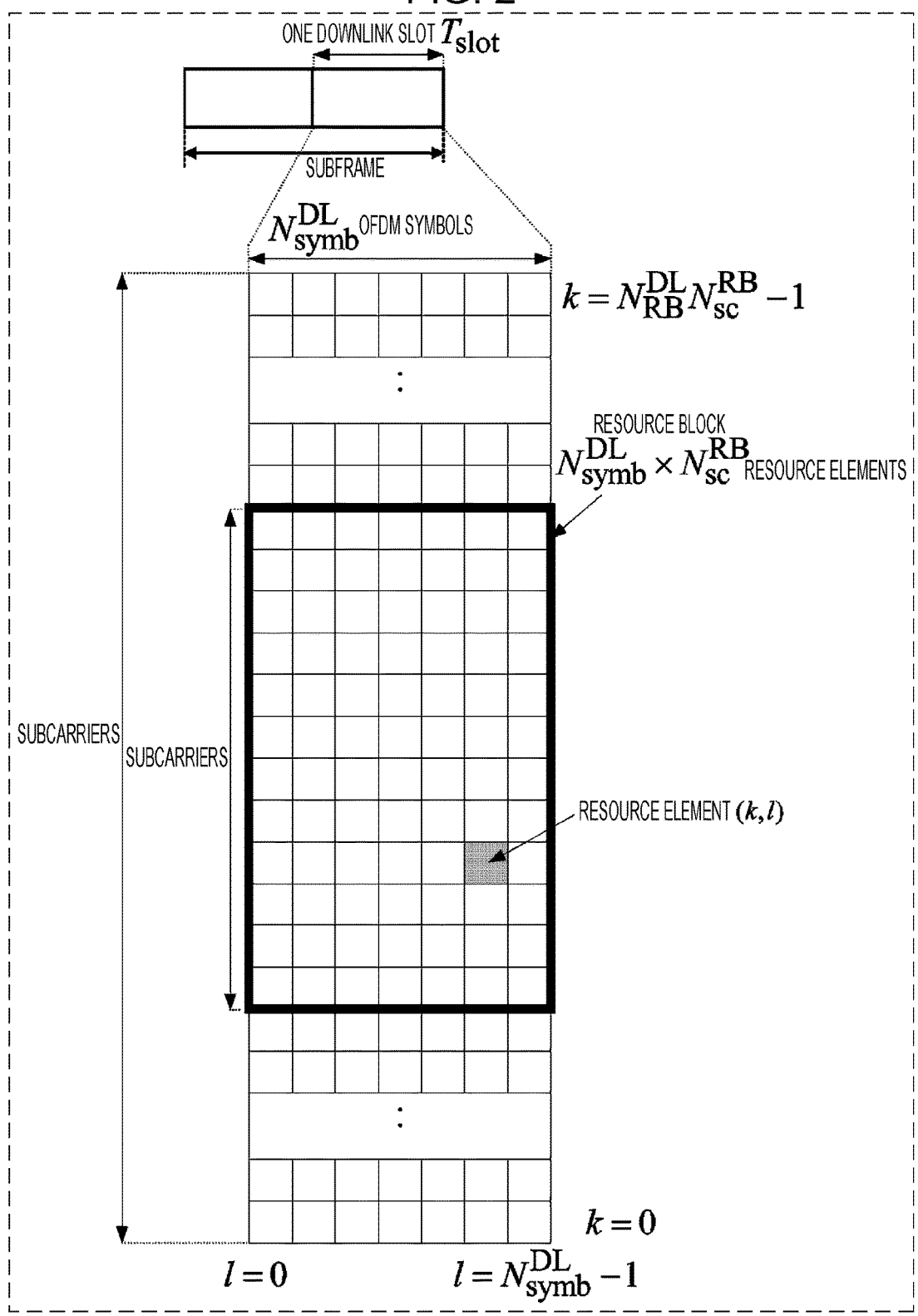
FIG. 2 shows an exemplary downlink resource grid of a downlink slot of a subframe as defined for 3GPP LTE (Release 8/9)

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

A "relay user equipment" as used in the set of claims and in the application is to be broadly understood as referring to a user equipment which is capable of serving as a relay for another user equipment (termed "remote user equipment"). This also involves the capability of supporting direct communication transmissions directly between two user equipments (see below D2D or ProSe). According to one implementation, the relay user equipment shall support relay functionality as defined for 3GPP LTE-A and as described in the background section. In said connection, the term "remote user equipment" shall merely indicate the role of the user equipment as being the peer of the relay user equipment, i.e. looking for a relay to establish direct communication with.

The term "radio resources" as used in the set of claims and in the application is to be broadly understood as referring to physical radio resources, such as time-frequency resources.

The term "direct communication transmission" as used in the set of claims and in the application is to be broadly understood as a transmission directly between two user equipments, i.e. not via the radio base station (e.g. eNB). Correspondingly, the direct communication transmission is performed over a "direct sidelink connection", which is the term used for a connection established directly between two user equipments. For example, in 3GPP the terminology of D2D (Device-to-Device) communication is used or ProSe communication, or a sidelink communication. The term "direct sidelink connection" as used in the set of claims and in the application is to be broadly understood and can be understood in the 3GPP context as the PC5 interface described in the background section.

The term "relay functionality" as used in the set of claims and in the application is to be broadly understood as the capability of a user equipment to act as a relay. In one exemplary implementation, the relay functionality is the functionality currently being standardized in the 3GPP work item as explained in detail in the background section.

The term "remote data" as used in the set of claims and in the application is to be broadly understood as data originating from (i.e. uplink) or destined to (i.e. downlink) a remote user equipment, i.e. a user equipment being connected via a relay user equipment to a radio base station. In other words, remote data is either generated by a remote user equipment to be transmitted in the uplink via the relay UE to the radio base station (and e.g. further toward a peer user equipment), or is generated by another peer user equipment but destined to the remote user equipment (and thus received by the remote user equipment via the relay user equipment). On the other hand, "relay data" as used in the set of claims and in the application is to be broadly understood as data originating from (i.e. uplink) or destined to (i.e. downlink) a relay user equipment, i.e. a user equipment having relay functionality so as to be capable of serving as a relay for remote user equipment(s). As such, "remote data" and "relay data" refer to data from different sources/destinations, such that a relay user equipment may have to transmit remote data in the uplink/downlink for one or more remote user equipments in addition to its own relay data.

3GPP is currently in the process of introducing a relay functionality for the ProSe-capable user equipments. Although some initial agreements have been achieved already (some of which are explained in detail in the background section), no agreements could yet be achieved for some important issues in connection with the ProSe relay functionality. As explained above in the detailed background section, when a UE, which was previously in the coverage area of E-UTRAN (i.e. coverage of an eNodeB), loses connection to the E-UTRAN (e.g. due to a bad channel environment such as a low geometry when moving into the cell-edge region or into a building), a ProSe UE-to-Network relay UE shall provide the functionality to support connectivity to "unicast" services for this UE (also termed remote UE). In particular, the remote UE communicates with the relay UE over the PC5 interface (i.e. ProSe direct communication), while the relay UE is connected via the Uu interface with the eNodeB. Correspondingly, one or more sidelink logical channel(s) are established between each of the remote UE(s) and the relay UE over which the respective remote data can be exchanged via the PC5 interface. On the other hand, the usual legacy logical channel(s) are established between the relay UE and the eNodeB to carry the relay data. Each of these different logical channels has their own ID, priority and QoS requirements to be fulfilled.

Thus, one important issue in such a scenario is how to efficiently provide the resource assignment function for a relay user equipment serving as a relay for one or more remote user equipments so as to ensure that the various QoS requirements of all the logical channels/data are fulfilled.

For instance, it is unclear how the eNodeB shall be able to distinguish remote logical channels from relay logical channels (assuming that a separate logical channel is set up/configured for carrying the remote data from the relay UE to the eNodeB). One possible way to ensure that the eNodeB distinguishes properly between remote and relay logical channels is to provide a one-to-one mapping between the sidelink logical channels (sidelink radio bearers between the remote UE(s) and the relay UE) and corresponding (remote) logical channels between the relay UE and the eNodeB. In particular, each sidelink logical channel/sidelink radio bearer of the PC5 interface is mapped to one logical channel/radio bearer of the Uu interface. However, this approach might be quite restrictive in view of that only a limited number of logical channel IDs (DRB IDs) is available (8 as currently standardized), such that this might be insufficient for several scenarios where multiple remote UEs are connected to one relay UE. Furthermore, there is the problem that the number of logical channel groups is also limited to only 4 at the moment, such that remote logical channels (of the Uu interface carrying the remote data) and relay logical channels could/must be grouped in the same logical channel groups. In consequence, the buffer status reports, which indicate the buffer size per logical channel group, and thus the eNodeB that receives the buffer status reports, would not be able to distinguish between remote logical channels and relay logical channels.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. For illustration purposes, several assumptions are made which however shall not restrict the scope of the following embodiments.

Furthermore, as mentioned above, the following embodiments may be implemented in the 3GPP LTE-A (Rel.12/13) environment. The various embodiments mainly allow for an improved scheduling procedure performed between a relay UE and the eNodeB by changing/improving particular mechanisms (resource scheduling as such, BSR, LCP, etc), other functionality (i.e. functionality not changed by the various embodiments) however may remain exactly the same as explained in the background section or may be changed without any consequences to the various embodiments. This is true for instance for various functions provided by the MAC entity in the UE and eNodeB (e.g. the HARQ, RACH, (de)multiplexing, control function) or the exact procedures so as to discover a relay UE, establish the direct sidelink connection with the discovered relay UE over which the relay is taking place, as well as for the exact procedure of how data is relayed between the remote user equipment and the relay user equipment etc.

A scenario may be assumed where user equipments are enabled to perform ProSe communication (ProSe-enabled UEs), i.e. direct D2D transmissions directly between UEs without the detour via the eNodeB. Furthermore, at least one of these (ProSe-enabled) UEs in the scenario shall support relay functionality as explained e.g. in the background section for the specific implementation in Release 13 of the 3GPP standard(s). In other words, this relay UE (which is located in a radio cell and connected to the corresponding radio base station controlling the radio cell) shall be capable to serve as a relay to other (ProSe-enabled) UEs (one or more remote UEs) thereby allowing these remote UE(s) to connect, via the relay, to the eNB. Further, it is assumed that one or more remote UEs indeed have selected the relay UE as a relay, and thus each of them is exchanging its remote data (i.e. data originating from or destined to that remote UE) with the radio base station via the relay. One or more suitable sidelink remote logical channels are set up between the relay UE and each remote UE so as to carry this remote data between the two UEs. Furthermore, it is assumed that also the relay UE actively communicates with the radio base station by exchanging relay data (i.e. data originating from or destined to the relay UE) by using corresponding (relay) logical channels set up between the relay UE and the radio base station.

First Embodiment

In the following a first embodiment for solving the above problem(s) will be described in detail. Different implementations of the first embodiment will be explained in detail below. According to the first embodiment, the radio resource scheduling performed by the eNodeB, and assisted by the relay UE, for the Uu interface is improved. In particular, the first embodiment is based on that different scheduling RNTIs (scheduling identifications) are configured for scheduling resources to the relay UE, one for the handling resource assignments to exchange the relay data and the other for handling resource assignments to exchange the remote data. In brief, by providing the different scheduling RNTIs, the scheduling performed by the eNodeB can distinguish between the two different types of data (i.e. remote and relay data) such that resource assignments are addressed to one of the two scheduling RNTIs, depending on whether the eNodeB assigns resources for exchanging remote data or for exchanging relay data. The relay UE follows these different resource assignments and either transmits/receives relay or remote data.

More in particular, as explained in the background section, different modes/types of scheduling are possible and distinguished from one another by corresponding RNTIs, the dynamic scheduling by use of a C-RNTI, the semi-persistent scheduling by use of an SPS-C-RNTI, and the multicast (MBMS) scheduling by use of an MBMS-RNTI, M-RNTI. Therefore, resource assignments, e.g. DCIs, transmitted over the (E)-PDCCH are addressed to the corresponding RNTI, such that the UE can identify the resource assignment as being destined to itself and such that the UE can further distinguish whether the resource assignment refers to dynamic scheduling, semi-persistent scheduling or multicast scheduling.

The eNodeB configures a particular UE with one of each of these RNTIs, as necessary. According to the first embodiment, an additional RNTI can be assigned by the eNodeB to a relay UE for the respective different kinds of scheduling modes, specifically so as to handle remote data. For instance, for the dynamic scheduling, a remote C-RNTI, R-C-RNTI, can be assigned by the eNodeB to a relay UE so as to address the one or more remote logical channels carrying the remote data between the relay UE and the eNodeB. Correspondingly, the C-RNTI known already from the related art (exemplarily termed in the following for discussion purposes "relay C-RNTI") would thus only be addressing the one or more relay logical channels carrying the relay data between the relay UE and the eNodeB.

Similarly, for the semi-persistent scheduling, a remote SPS-C-RNTI, R-SPS-C-RNTI, can be assigned by the eNodeB to a relay UE so as to address the one or more remote logical channels carrying the remote data between the relay UE and the eNodeB. Correspondingly, the SPS-C-RNTI known already from the related art (exemplarily termed in the following for discussion purposes "relay SPS-C-RNTI") would thus only be addressing the one or more relay logical channels carrying the relay data between the relay UE and the eNodeB.

The above similarly applies to the multicast scheduling, where a remote M-RNTI, R-M-RNTI, can be assigned by the eNodeB to a relay UE, in addition to the usual M-RNTI, to distinguish resource assignments for MBMS between remote data and relay data.

The additional scheduling RNTIs (for remote data) are configured and assigned e.g. by the eNodeB in a similar manner as already done for the currently-standardized RNTIs, C-RNTI, SPS-C-RNTI, M-RNTI etc. In particular, during connection establishment of the relay UE with an eNodeB, the eNodeB will assign e.g. the C-RNTI for the usual dynamic scheduling, and, as the eNodeB learns that the relay UE might act as a relay, will additionally assign e.g. the R-C-RNTI.

The following discussion will assume only dynamic scheduling so as to facilitate the description of the variants and implementations of the first embodiment, i.e. an additional remote C-RNTI is configured for the relay UE. However, it should be noted that the present disclosure also applies to semi-persistent scheduling (with the additional R-SPS-C-RNTI) as well as to multicast scheduling (with the additional R-M-RNTI).

In a system set up as discussed above with two different C-RNTIs to distinguish between scheduling for remote data and scheduling for relay data, the eNodeB will be able to specifically address a resource assignment to either the C-RNTI or the remote C-RNTI. This applies to both downlink resource assignments and uplink resource grants for remote or relay data.

For downlink, the resource scheduling performed by the eNodeB will consider the buffer status of the eNodeB for the remote logical channels and the relay logical channels so as to then assign (downlink) radio resources to transmit either the relay data or the remote data to the relay UE. As usual, a corresponding downlink resource assignment (e.g. DCI of Format 1A, B, C; D or corresponding Format 2 DL related DCIs) can be transmitted over the (E)-PDCCH to the relay UE indicating the radio resources at which the relay UE shall receive the downlink remote or relay data from the eNodeB. This downlink resource assignment can correspondingly be addressed to either the relay C-RNTI, thereby indicating that the downlink resource assignment is applicable to the relay logical channels (relay data), or to the remote C-RNTI, thereby indicating that the downlink resource assignment is applicable to the remote logical channels (remote data). The relay UE knows from the particular RNTI included in the received downlink resource assignment that the data to be received is either remote or relay data and further will be able to receive the downlink remote/relay data at the indicated radio resources. Additionally, in case of remote data, the relay UE will relay this downlink remote data further toward the remote UE as will be explained in more detail later.

For uplink, the resource scheduling performed by the eNodeB will consider the buffer status in the relay UE for the remote and relay logical channels, reported to the eNodeB by the relay UE using buffer status reports as will be explained later. The eNodeB thus decides on the uplink radio resources to assign to the relay UE for the relay UE to transmit either the relay data or the remote data to the eNodeB. As usual, a corresponding uplink resource grant (e.g. DCI of Format 0) can be transmitted over the (E)-PDCCH to the relay indicating the radio resources which the relay UE may use to transmit relay or remote data to the eNodeB. The eNodeB will include either the relay C-RNTI or the remote C-RNTI into the uplink resource grant, depending on whether the uplink resource grant shall be applicable to the relay logical channels (relay data) or the remote logical channels (remote data). The relay UE correspondingly learns, from the included RNTI in the uplink resource grant, whether it shall use the radio resources indicated in the uplink resource grant to transmit relay data or remote data. In order to generate the uplink data, in general a logical channel prioritization procedure is used by (relay) UEs, as explained in the background section.

Correspondingly, upon receiving the above mentioned uplink resource grant from the eNodeB, the relay UE may similarly perform a logical channel prioritization, LCP, procedure to prepare and generate the uplink data. According to one implementation of the first embodiment, separate LCP procedures are provided in the relay UE, one LCP procedure for handling relay logical channels and the corresponding relay data, and the other LCP procedure for handling remote logical channels and the corresponding remote data. In other words, the relay LCP procedure will only consider the relay logical channels (but no remote logical channels), and conversely, the remote LCP procedure will only consider the remote logical channels (but no relay logical channels). In a corresponding 3GPP implementation of the first embodiment, the separate LCP procedures might otherwise work as described in detail in the background section and the various technical 3GPP standards. For instance, the relay/remote logical channels may be considered during the relay/remote LCP procedure in a decreasing order of their corresponding logical channel priority.

Upon receiving an uplink resource grant addressed to the relay C-RNTI, the relay UE will perform a relay LCP procedure, thereby only considering relay logical channels and the relay data in the corresponding buffers. The relay LCP procedure will distribute the indicated radio resources between the relay logical channels that will carry the relay data to generate a MAC PDU (transport block). As a result, a transport block is generated by the relay LCP procedure comprising relay data (and possibly further control data, e.g. MAC CEs), but no remote data. Conversely, upon receiving an uplink resource grant addressed to the remote C-RNTI, the relay UE will perform a remote LCP procedure, thereby only considering remote logical channels and the remote data in the corresponding buffers. The remote LCP procedure will distribute the indicated radio resources between the remote logical channels that will carry the remote data to generate a MAC PDU (transport block). As a result, a transport block is generated by the remote LCP procedure comprising remote data (and possibly further control data, e.g. MAC CEs), but no relay data.

The thus generated transport block (with either relay data or remote data) will then be transmitted by the relay UE to the eNodeB using the indicated radio resources.

According to another implementation of the first embodiment, instead of providing separate logical channel prioritization procedures for handling the remote data and the relay data, a common logical channel prioritization procedure is provided in the relay UE. In said case however, the relay UE has to selectively disregard during the common LCP procedure the particular relay/remote logical channels for which the uplink resource assignment is not applicable. In particular, the common LCP procedure is set up so as to be able to consider all of the logical channels configured for the relay UE, i.e. both the relay logical channels and the remote logical channels. However, upon receiving a particular uplink resource grant being addressed to either the relay C-RNTI or the remote C-RNTI, the common LCP procedure shall only consider the relevant logical channels, be it the remote or relay logical channels, while ignoring the irrelevant logical channels, be it the relay or remote logical channels. As with the previous implementation, the relay UE will thus generate a MAC PDU (transport block) comprising either the relay data or the remote data (and possibly further control data), and will then transmits the generated transport block to the eNodeB.

Figure 3:
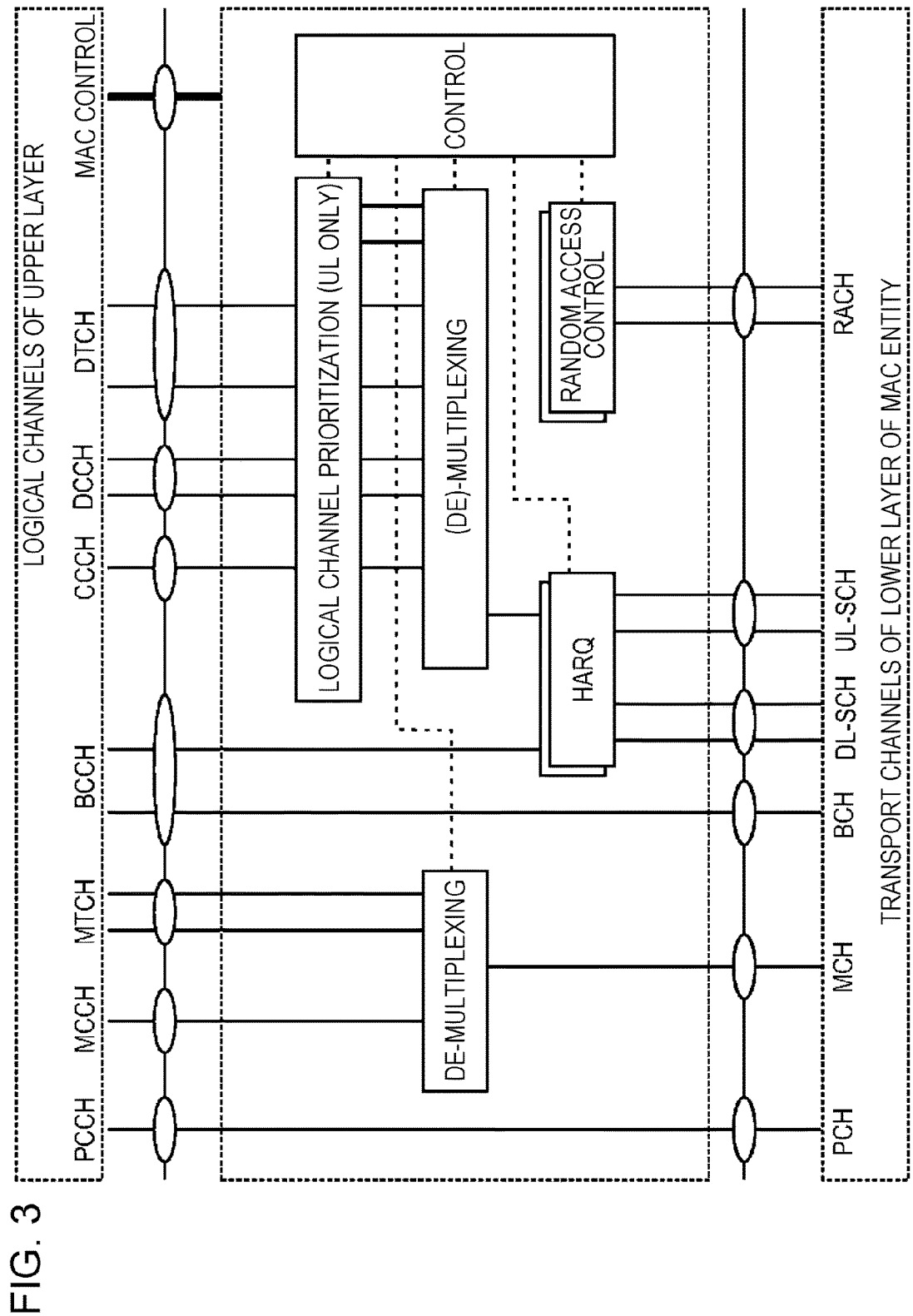
FIG. 3 illustrates an exemplary MAC structure of the UE side.
Figure 4:
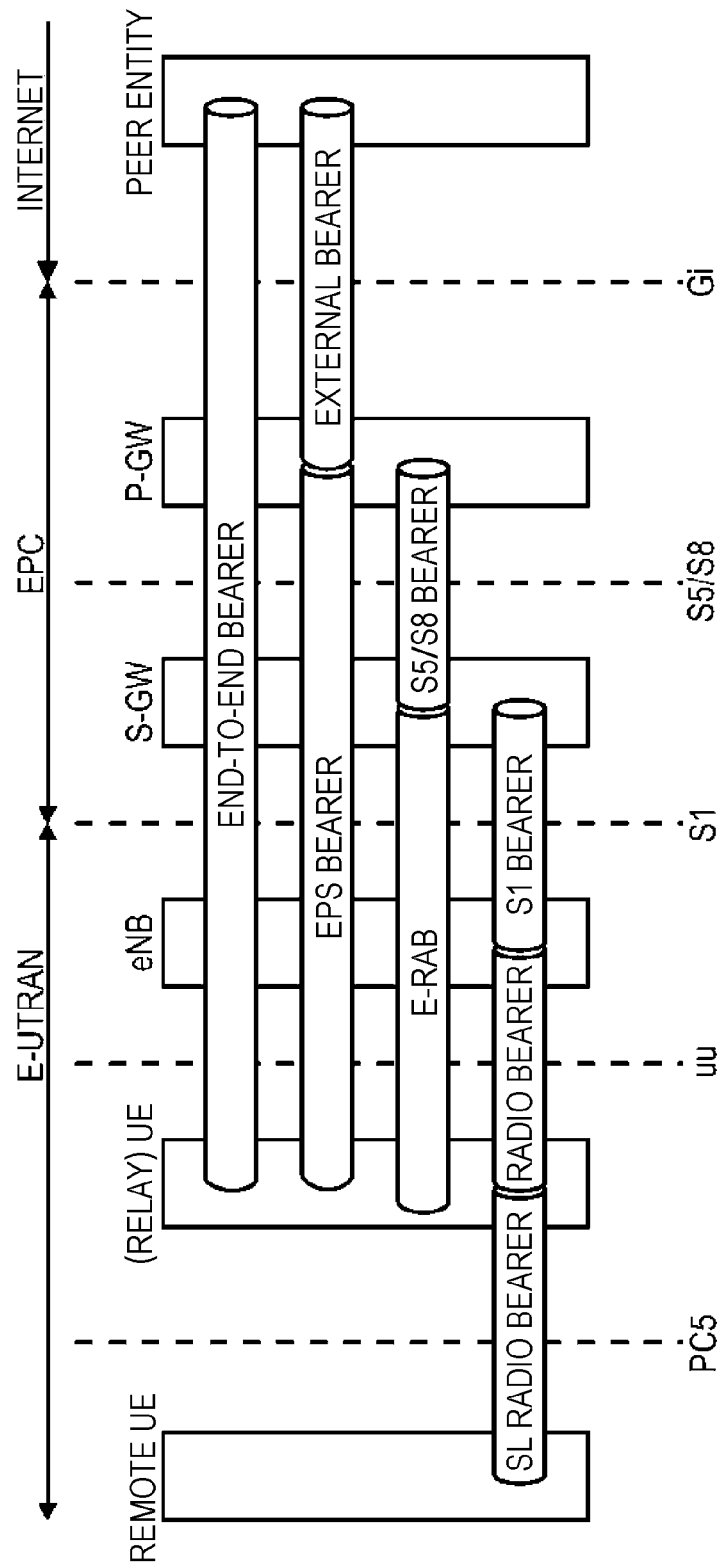
FIG. 4 illustrates the bearer architecture for LTE.
Figure 5:
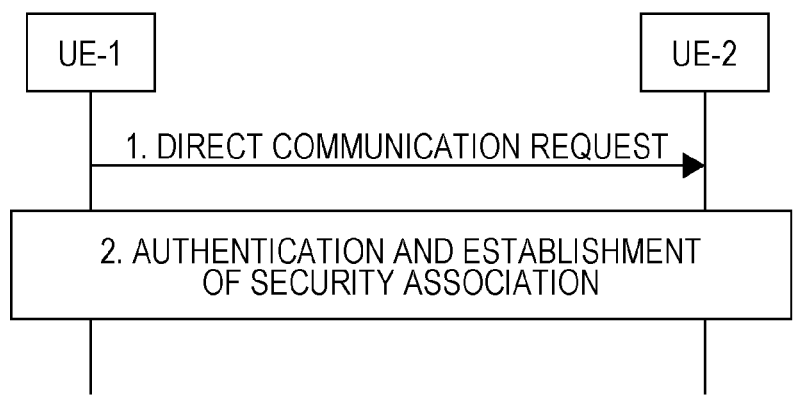
FIG. 5 schematically illustrates how to establish a layer-2 link over the PC5 for ProSe communication.
Figure 6:
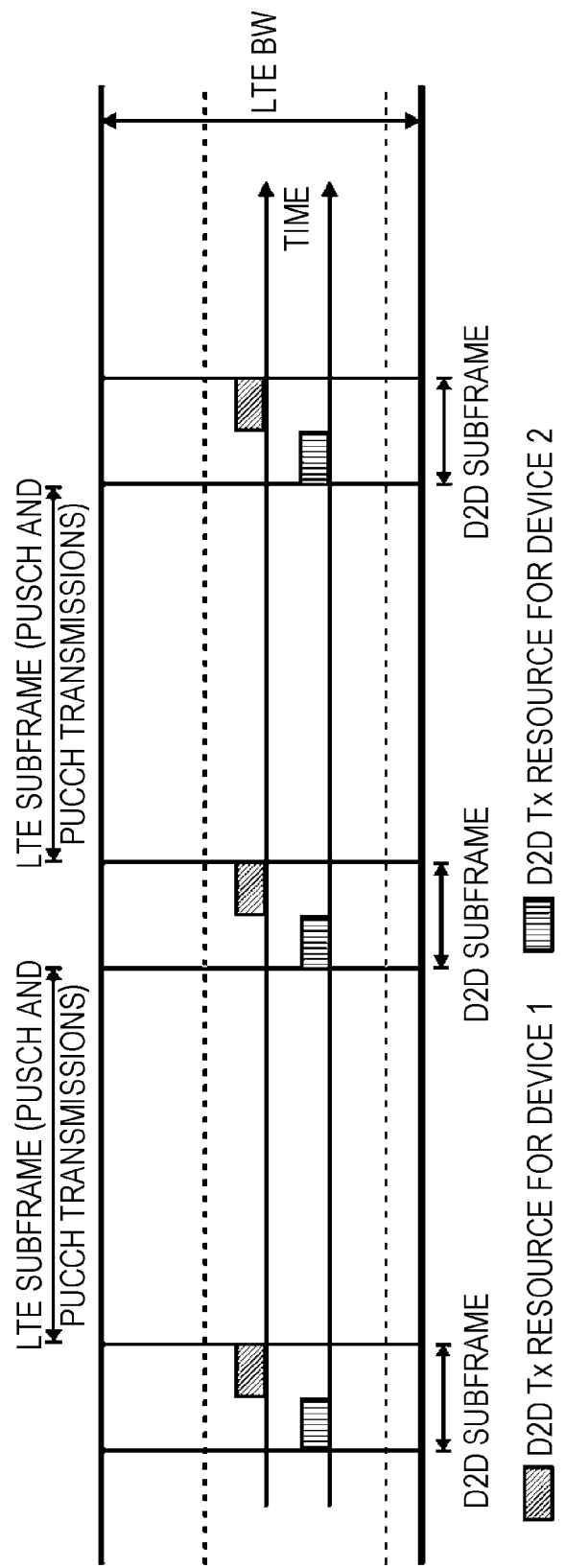
FIG. 6 illustrates the use of transmission/reception resources for overlay (LTE) and underlay (D2D) systems.
Figure 7:
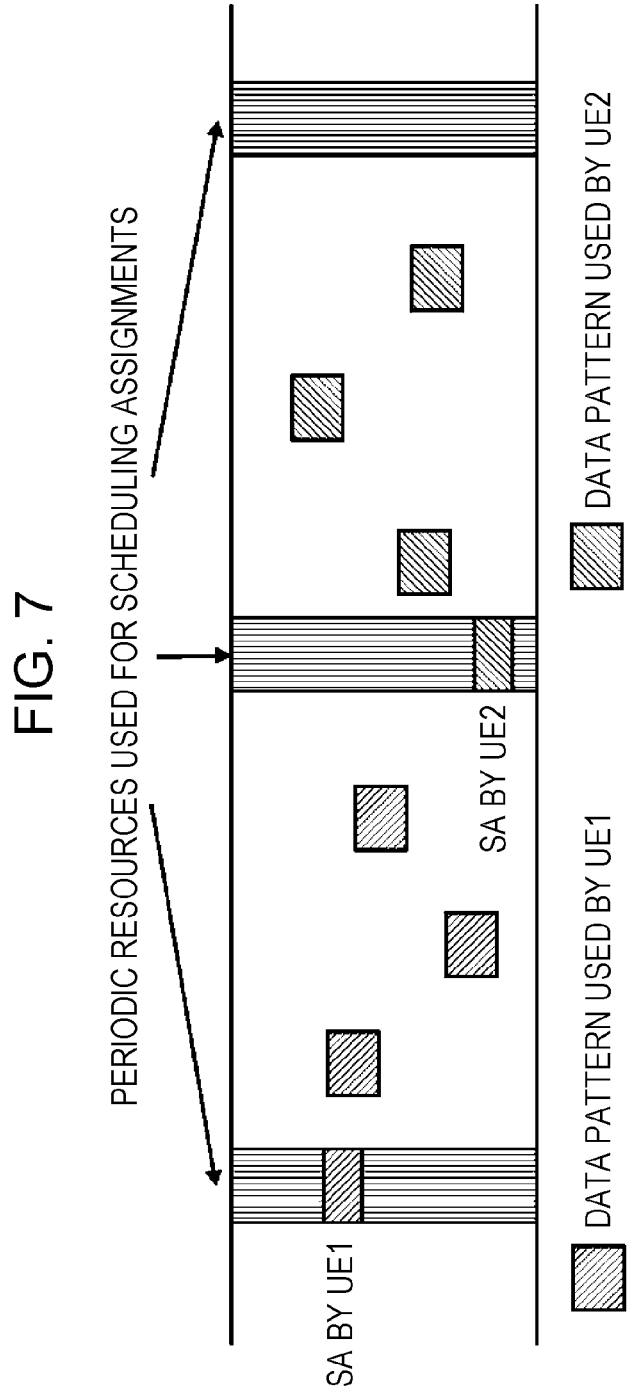
FIG. 7 illustrates the transmission of the Scheduling Assignment and the D2D data for two UEs.
Figure 8:
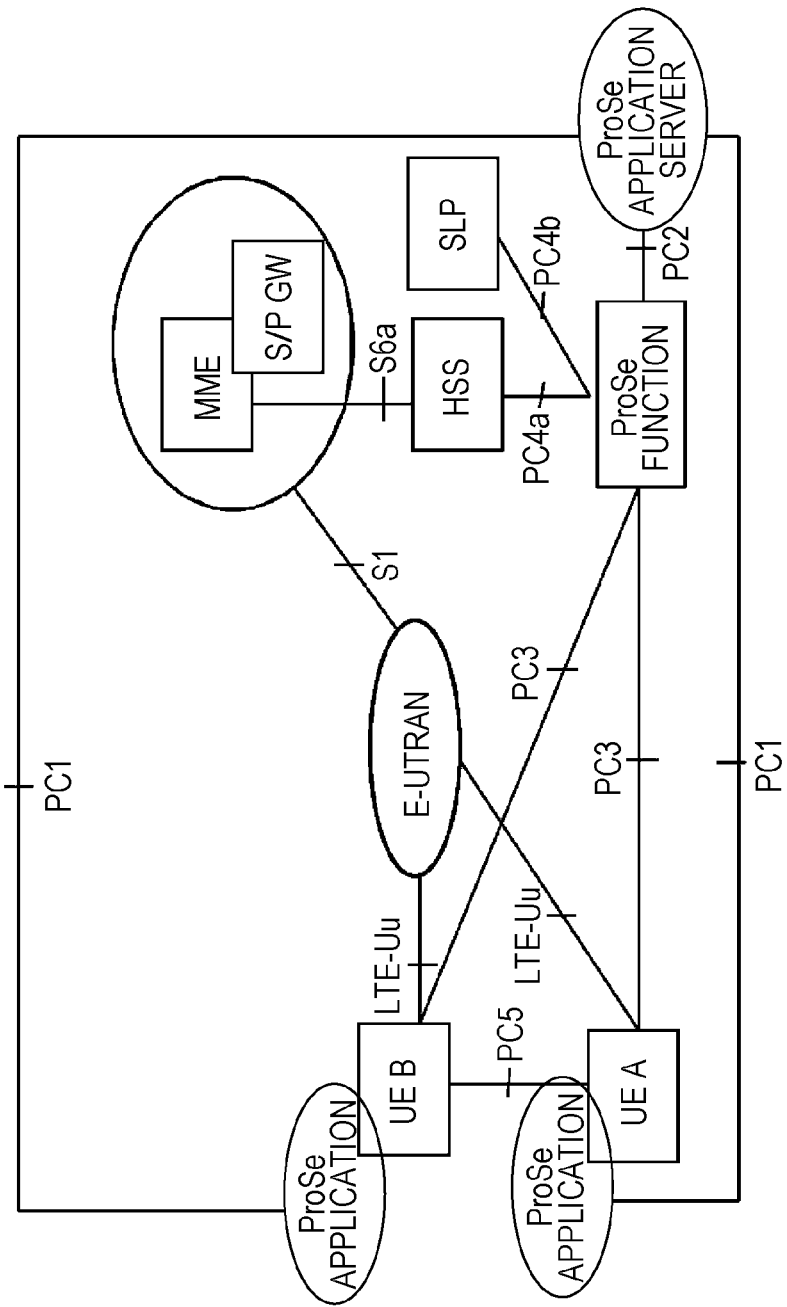
FIG. 8 illustrates an exemplary architecture model for ProSe for a non-roaming scenario.
Figure 9:
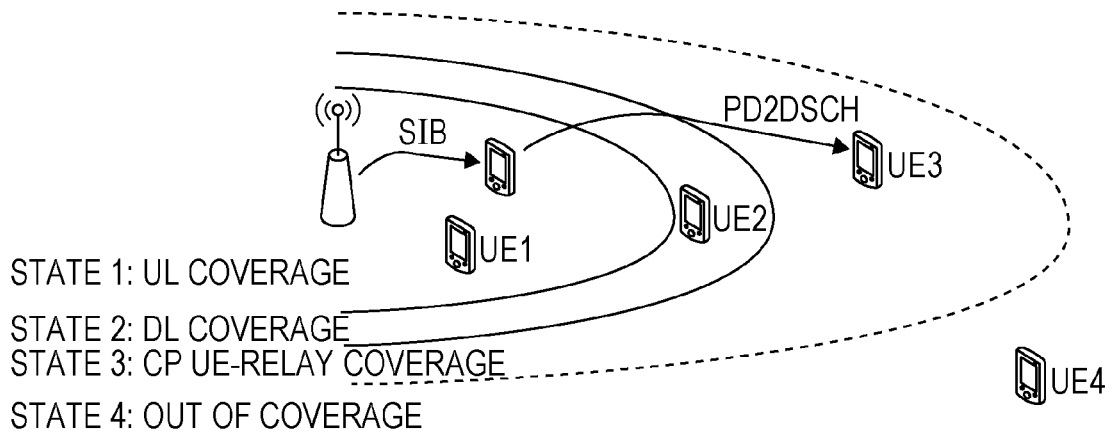
Figure 10:
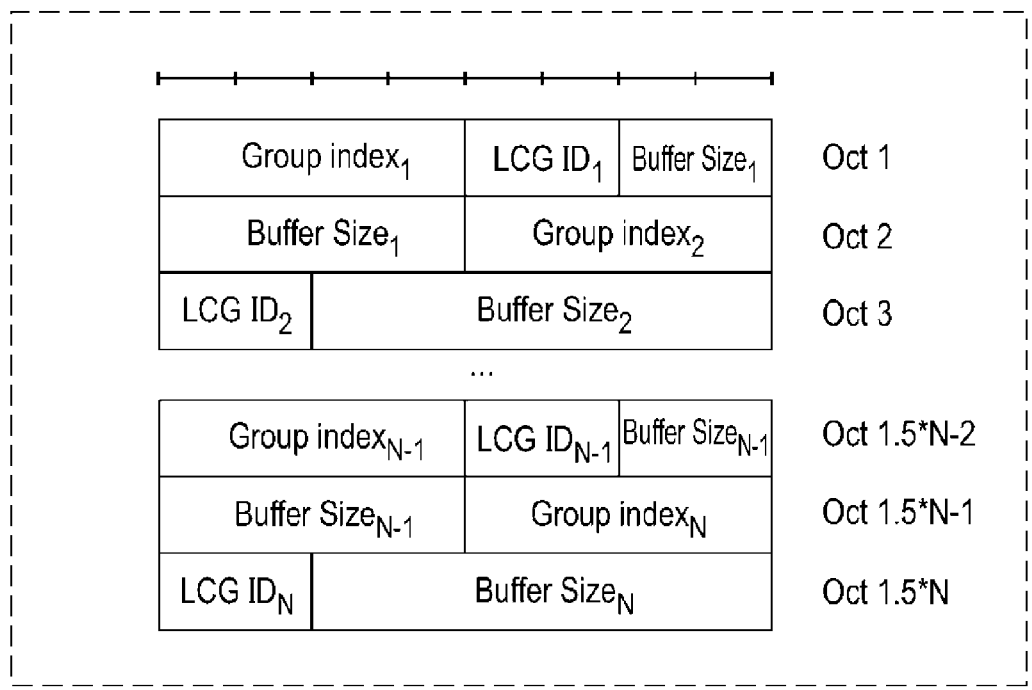
FIG. 10 illustrates an exemplary ProSe buffer status report MAC control element for an even number of ProSe destination groups.
Figure 11:
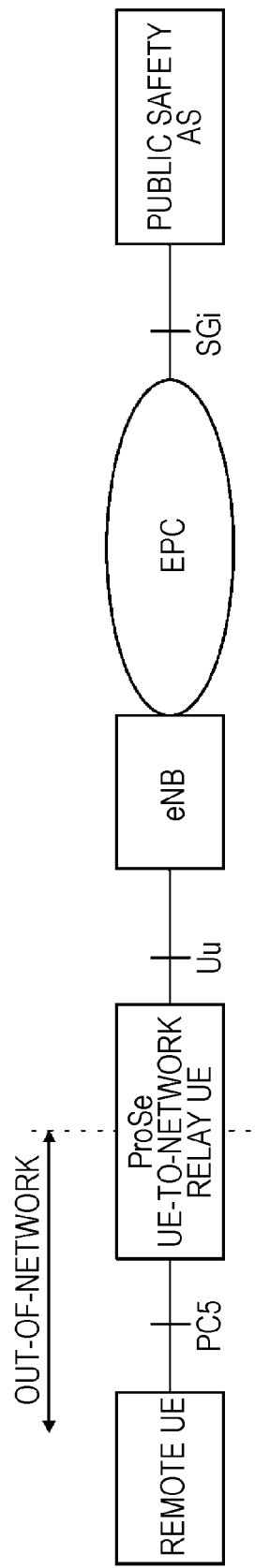
FIG. 11 shows a ProSe UE-to-Network Relay scenario.
Figure 12:
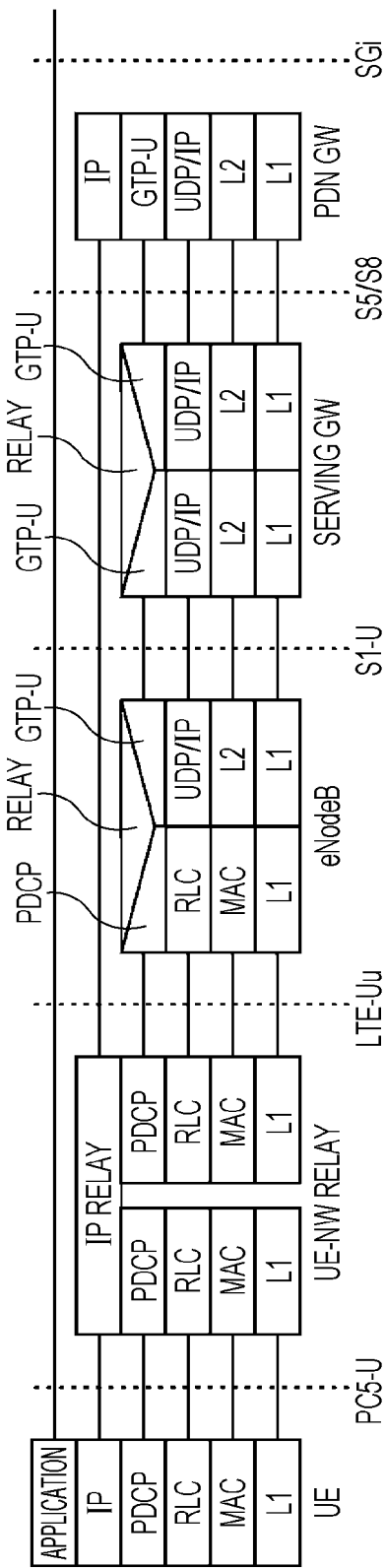
FIG. 12 shows the user plane protocol architecture for the ProSe UE-to-Network relay.
Figure 13:
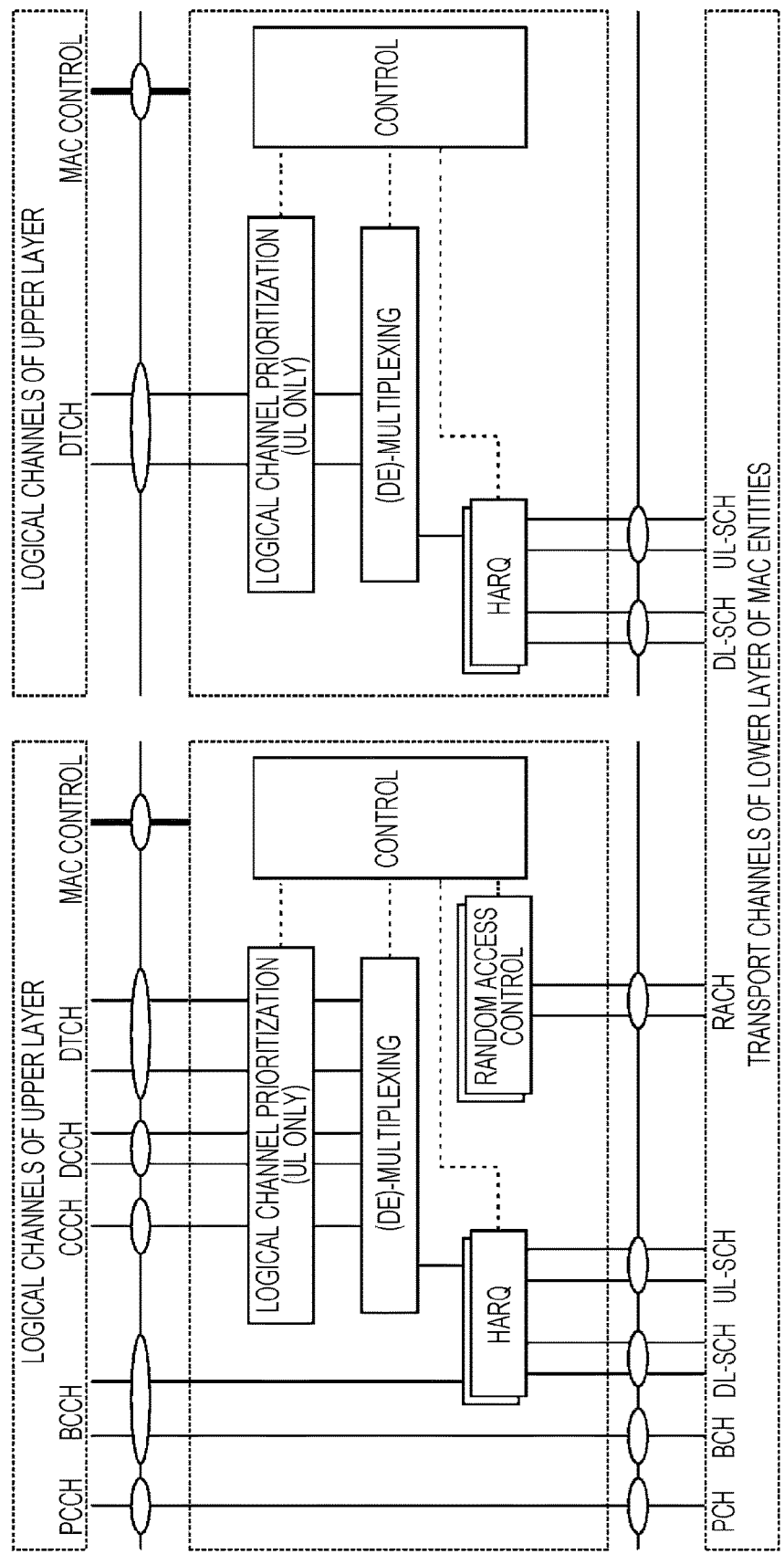
FIG. 13 shows the structure of two MAC entities for the relay UE according to an exemplary implementation of the first embodiment.
Figure 14:
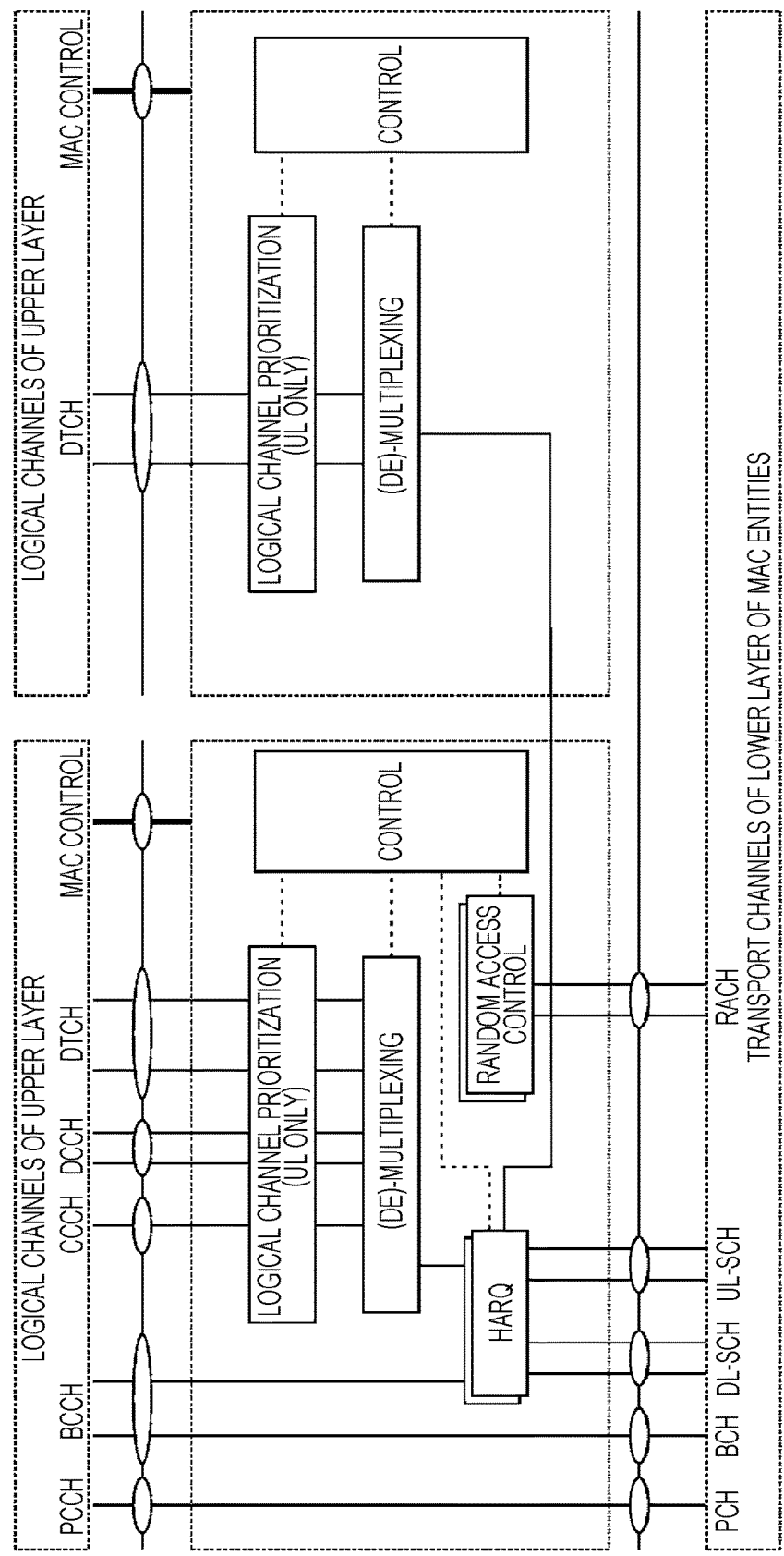
FIG. 14 shows another structure of the 2 MAC entities for the relay UE according to another exemplary implementation of the first embodiment.

In one particular implementation of the first embodiment, two separate MAC entities are provided in the relay UE, i.e. the usual MAC entity so as to handle the usual (relay) data, and an additional MAC entity for handling the remote data. FIG. 13 exemplarily illustrates the structure of the two MAC entities in the relay UE according to this implementation of the first embodiment. As apparent, the usual relay MAC entity on the left side of FIG. 13 is basically the same as the one discussed in the background section with reference to FIG. 3, although the MBMS reception (MCH demultiplexing to MCCH and MTCH) is omitted in FIG. 13 for simplicity. The additional remote MAC entity on the right side of FIG. 13 basically includes the same entities as the usual relay MAC entity, i.e. the LCP procedure, HARQ entity, control function, and (de)-multiplexing entity. It should be noted, that the structure of the remote MAC entity is merely an example. As already mentioned before, a common LCP procedure (then, e.g. located in the relay MAC entity) can be used, instead of providing separate LCP procedures, the relay LCP procedure in the relay MAC entity and the remote LCP procedure in the remote MAC entity. A further variant of the remote MAC entity in the relay UE is illustrated in FIG. 14, where the (common) HARQ entity of the relay MAC entity is reused also for the remote data retransmissions.

Since separate MAC entities are provided in the relay UE to handle the different relay and remote data, the relay C-RNTI will correspondingly be associated to the relay MAC entity of the relay UE, while the remote C-RNTI will correspondingly be associated to the remote MAC entity of the relay UE. As will be explained in more detail below, the additional MAC entity will also be associated with additional logical channel groups for improving the buffer status reporting, as well as with additional remote logical channel IDs (DRB IDs) to be able to set up dedicated logical channels/radio bearer for carrying the remote data between the relay UE and the eNodeB even for scenarios where the number of preconfigured logical channel IDs of the related art do not suffice. It should be noted that only data radio bearers may be set up between the relay UE and the eNodeB for carrying the remote data. Since the relay UE only has one RRC Connection with the E-UTRAN/eNB, there is no need to establish also remote signaling radio bearers between the relay UE and the eNodeB. All RRC/NAS signaling message may be conveyed by the SRBs which are already established, i.e. associated with the legacy (relay) MAC entity. Therefore, from relay UE point of view, the remote data is considered as only data traffic, e.g. DTCH/DRB is established between the relay UE and the eNodeB for remote data. Nevertheless, also control signaling like NAS signaling or higher layer control message can be transmitted with the remote logical channels/remote DRBs.

Furthermore, the transport channels of the MAC layer (entities) will not be changed such that the same DL-SCH and UL-SCH will be used by both MAC entities. For ease of illustration, FIG. 13 repeats at the bottom the DL-SCH and UL-SCH for both MAC entities; however, the DL-SCH and UL-SCH illustrated in connection with the relay MAC entity shall be the same as the DL-SCH and UL-SCH illustrated in connection with the remote MAC entity.

According to further implementations of the first embodiment, the buffer status reporting procedure performed by the relay UE will be improved as well to effectively assist the eNodeB to generate the separate uplink resource assignments. As explained before, the eNodeB will use the information provided by buffer status report(s) so as to decide on how many radio resources are to be assigned to a particular (relay) UE. Advantageously, the relay UE should separately report the relay data and remote data available for transmission to the radio base station in the relay UE buffers. Correspondingly, the relay UE may generate a relay buffer status report to indicate the amount of relay data buffered at the relay UE for transmission to the eNodeB. Conversely, the relay UE may additionally generate a remote buffer status report to indicate the amount of remote data buffered at the relay UE for transmission to the eNodeB.

In an exemplary variant where the already standardized buffer reporting procedure of 3GPP is reused as far as possible, the relay and remote buffer status reporting of the first embodiment shall also be based on logical channel groups (to which the logical channels are assigned). In order to be able to distinguish between the different relay/remote logical channels within the buffer status report, additional logical channel groups are defined for the remote logical channels where each of the remote logical channels is assigned to one of the additional remote logical channel groups. The remote logical channel group configuration and assignment of the remote logical channels to one of the groups can be performed in a corresponding manner to the usual (relay) logical channels and (relay) logical channel groups. In particular, the relay/remote logical channel groups are predefined (e.g. four remote respectively legacy (relay) logical channel groups), and associated with corresponding priorities, and the eNodeB assigns the relay/remote logical channels to the corresponding relay/remote logical channel groups such that similar priorities are grouped in one logical channel group.

In summary, the relay/remote logical channels/radio bearer, configured between the relay UE and the eNodeB, will each be assigned to a corresponding relay/remote logical channel group. The usual 3GPP buffer status reporting, which reports the buffered data per logical channel group, can be applied to this scenario as well. As a result, a relay buffer status report would report the amount of relay data over all relay logical channels by comprising a buffer status field for each relay logical channel group, this buffer status field indicating the amount of relay data available for transmission to the radio base station across all relay logical channels of said relay logical channel group (see also BSR in the background section). On the other hand, a remote buffer status report would report the amount of remote data over all remote logical channels, by comprising a buffer status field for each remote logical channel group, this buffer status field indicating the amount of remote data available for transmission to the radio base station across all remote logical channels of said remote logical channel group.

The format and content of the remote buffer status report can be in the same manner as the usual relay buffer status report, e.g. a long or short BSR as explained in the background section, the long BSR comprising four buffer size fields corresponding to the four LCGs 0-3, and the short BSR including one buffer size field for one LCG. Alternatively, a different format can be foreseen for the remote buffer status report, e.g. only including a buffer size field for a remote logical channel group which remote logical channels indeed carry remote data (i.e. no buffer size fields indicating zero data).

Moreover, in the implementation of the first embodiment according to FIGS. 13 and 14 with two separate MAC entities, the additional remote MAC entity could also support four logical channel groups in the same manner as the usual/legacy (relay) MAC entity. In one implementation, there could be a separate BSR procedure for the additional remote MAC entity, generating the remote buffer status report (for the remote data) to be transmitted to the eNodeB; the corresponding BSR procedure in the relay MAC entity will generate the relay buffer status report for the relay data. According to this implementation the remote BSR procedure would have its own separate independent BSR related timers/counters compared to the legacy (relay) BSR procedure. In one exemplary implementation the remote buffer status report (in the remote BSR MAC CE) would be transmitted only in a remote MAC PDU/transport block, i.e. uplink resources assigned to the remote logical channels respectively remote C-RNTI. Conversely, a legacy (relay) buffer status report would be only included in a legacy (relay) MAC PDU/transport block, i.e. uplink resources assigned to the relay logical channels respectively legacy (relay) C-RNTI.

Even when providing two separate BSR procedures independently in the two MAC entities, some scheduling related functions in the relay UE may be used in common, such as the dedicated scheduling request transmitted on the PUCCH to request uplink resources. More in particular, both BSR procedures would use the common PUCCH channel or scheduling request procedure, e.g. could be also RACH procedure, in order to request uplink resources for the transmission of the buffer status report(s).

According to some alternative implementation, a remote buffer status report (e.g. in the remote BSR MAC CE) is also transmitted in a legacy (relay) MAC PDU/transport block, i.e. uplink resources assigned to the legacy (relay) RNTI. Since the eNB cannot distinguish based on the dedicated scheduling request sent on PUCCH or based on the RACH preamble whether the relay UE intends to send data for the remote logical channels or relay logical channels respectively remote BSR MAC CE or legacy (relay) BSR MAC CE, the eNB might assign in response to the received scheduling request only an uplink resource assignment addressed to the legacy (relay) RNTI, e.g. C-RNTI. Therefore, in order not to delay the transmission of a remote BSR MAC CE, the relay UE also includes the remote BSR MAC CE in a legacy (relay) MAC PDU/transport block. Correspondingly, the legacy (relay) BSR MAC CE may be also transmitted within a remote MAC PDU/transport block.

Furthermore, the two buffer status reports can be provided in the same or separate MAC CEs. In case of using separate MAC CEs, advantageously the MAC CE carrying the remote BSR is prioritized over the MAC CE carrying their relay BSR, when performing the LCP procedure.

According to yet another alternative implementation, a common BSR procedure could be used in the relay UE even though a new additional remote buffer status report will be generated in order to assist the eNB for the scheduling. In this case, new remote BSR trigger condition(s) will be added to the legacy (relay) buffer status reporting procedure, which will define the events for generating a remote buffer status report. In this case, no new additional BSR-related timer would be necessary.

Further implementations of the first embodiment refer to the mapping between remote sidelink logical channels and remote logical channels. In particular, it is assumed that there would be one or more remote logical channels configured between the relay UE and the radio base station so as to carry the remote data in the uplink and downlink. However, it is first unclear how many remote logical channels should be configured and further how the mapping of these remote logical channels and the corresponding remote sidelink logical channels (i.e. those logical channels between the relay UE and the remote UEs) should be.

For instance, there could be only one remote logical channel which would carry all remote data between relay UE and eNodeB. Alternatively, a one-to-one mapping can be configured such that for each remote sidelink logical channel set up between the relay UE and a remote UE, a corresponding remote logical channel between the relay UE and the eNodeB is configured, further linking these two together in a one-to-one manner. Correspondingly, remote data carried by a remote logical channel would be multiplexed to the corresponding remote sidelink logical channel, and vice versa.

Still alternatively, a remote logical channel can be configured per QoS priority (per QCI) that is to be fulfilled for existing remote data communication. In particular, the relay UE and eNodeB will set up remote logical channels based on the QoS requirements that need to be fulfilled for the transmission/relaying of the remote data.

In any case, one variant of the first embodiment includes the definition of further logical channel IDs (DRB IDs) for use in connection with relaying of remote data. Eight different DRB IDs are currently defined in the 3GPP standard. For example, additional eight DRB IDs could be foreseen to distinguish between remote logical channels.

According to one implementation of the first embodiment, a particular QoS/priority-based mapping between remote logical channels and remote sidelink logical channels is provided. In more detail, in the uplink, n-to-1 mapping rules can be defined which map the remote sidelink logical channels of a particular priority or QoS requirement to the one corresponding remote logical channel of said same or similar particular priority or QoS requirement. In consequence, remote data received in the relay UE from one or more remote UEs having the same or similar priority or QoS requirement, will be multiplexed to a remote logical channel being associated with the same or similar priority and thus being able to fulfill the corresponding QoS requirements.

Conversely, in the downlink, 1-to-n mapping rules can be defined which map one particular remote logical channel of a particular priority or QoS requirement to those corresponding remote sidelink logical channels (to one ore more remote UEs) having the same or similar particular priority or QoS requirement. In consequence, remote data received in the real UE from the radio base station will be demultiplexed to the various remote sidelink logical channels (to one or more remote UEs) being associated with the same or similar priority and thus being able to fulfill the corresponding QoS requirements.

Figure 15:
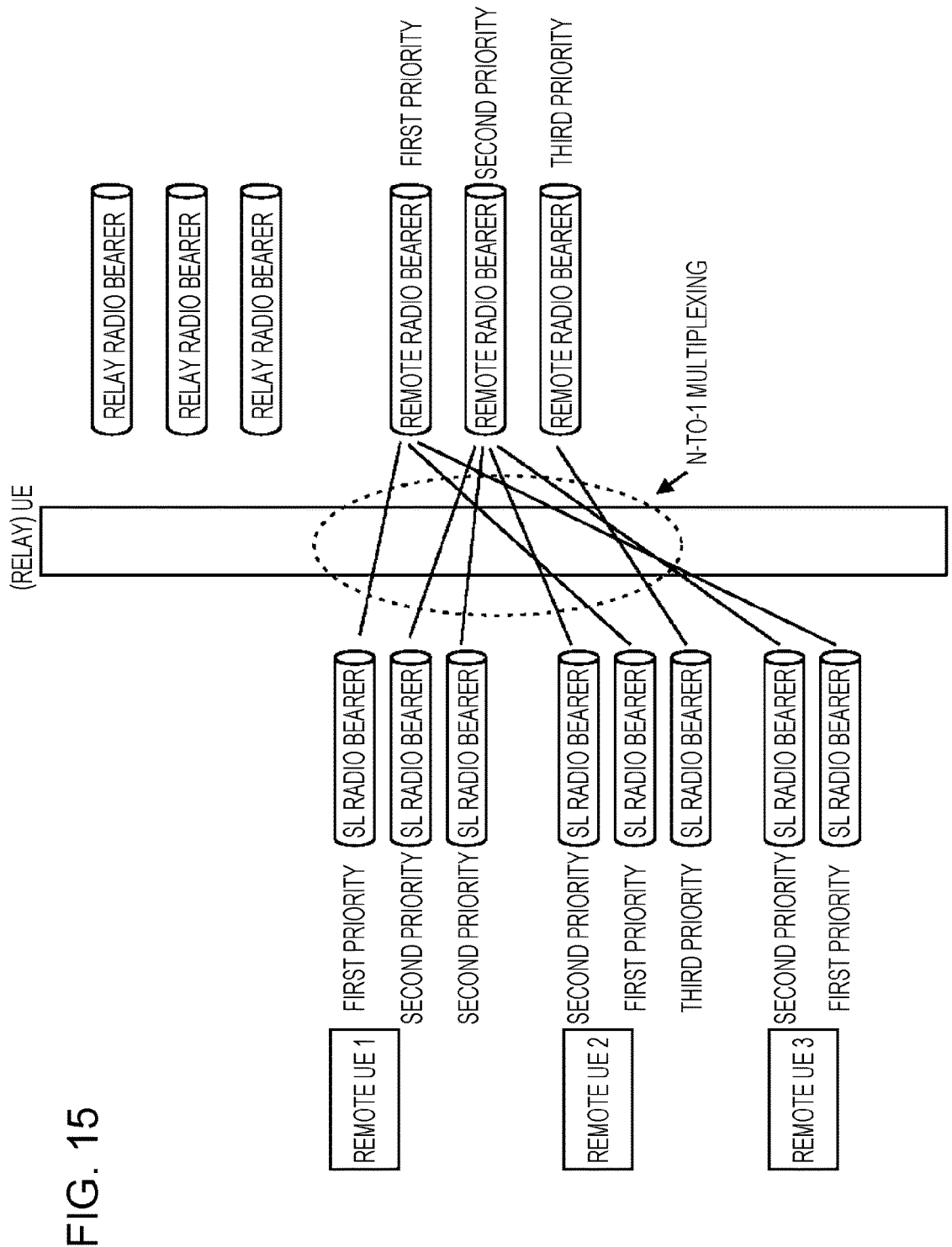
FIG. 15 illustrates a logical channel mapping between sidelink radio bearers and remote radio bearers to be used in connection with the first and second embodiments.

These mapping rules will be illustrated in FIG. 15, illustrating a n-to-1 and 1-to-n mapping performed by the relay UE, as explained above.

Further improvements of the first embodiment foresee that the eNodeB should only issue one scheduling grant (e.g. uplink resource assignment) in a transmission time interval (e.g. a subframe), be it to transmit relay data or remote data, so as to avoid that multiple transport blocks will have to be transmitted in one subframe. For this improvement it is assumed that there is only one component carrier (serving cell) configured over which a transport block is transmitted per subframe. On the other hand, if carrier aggregation is used on the Uu interface, several transport blocks can be transmitted, and the eNodeB may also issue several grants, for instance one relay resource assignment and one remote resource assignment, though still only one scheduling grant, i.e. uplink resource assignment, on one serving cell/component carrier in order not to destroy the single-carrier property on a serving cell. More in particular and according to an additional or alternative improvement, when the relay UE is operating in a carrier aggregation mode, the remote data and the relay data are transmitted to the radio base station via different carriers (cells).

Second Embodiment

Furthermore, in the following a second embodiment, and different variants and implementations thereof, will be explained for solving one or more of the above discussed problems. Similar assumptions can be made as for the first embodiment such as having a relay UE being in communication with an eNodeB and serving as the relay for one or more remote UEs. Consequently, one or more suitable sidelink remote logical channels are set up between the relay UE and each remote UE so as to carry the remote data between the two UEs. In addition, one or more remote logical channels can be established between the relay UE and the eNodeB for carrying the remote data. Furthermore, it is assumed that also the relay UE actively communicates with the radio base station by exchanging relay data (i.e. data originating from or destined to the relay UE) by using corresponding (relay) logical channels set up between the relay UE and the radio base station.

As with the first embodiment, the second embodiment shall improve the resource scheduling performed by the eNodeB and assisted by the relay UE, for assigning resources on the Uu interface to be used by the relay UE to receive or transmit data. However, instead of providing separate scheduling identities for handling remote data and relay data as in the first embodiment, the second embodiment does not change the scheduling RNTI(s) provided in the current standardization, i.e. thus using for instance the C-RNTI for dynamic scheduling, the SPS-C-RNTI for semi-persistent scheduling, and the M-RNTI for MBMS scheduling.

According to the second embodiment, the buffer status reporting procedure, performed by the relay UE to assist the uplink resource assignment procedure in the eNodeB, is improved. Separate buffer status reports are generated and transmitted for the relay data and the remote data pending in the relay UE for transmission to the eNodeB. In addition, separate logical channel groups are defined for the separate buffer status reporting mentioned above.

As explained in the background section, the already standardized buffer reporting procedure of 3GPP is based on logical channel groups (to which the logical channels are assigned) to thereby indicate in the buffer status report(s) the pending data per logical channel group. Correspondingly, four legacy/relay logical channel groups are defined, and the eNodeB assigns the legacy/relay logical channels to one of the four relay logical channel groups such that similar/same priorities/QoS are grouped in one relay logical channel group. In addition, further remote logical channel groups (e.g. also four) can be introduced/defined for the remote logical channels, and each of the remote logical channels may be assigned to one of the additional remote logical channel groups, e.g. in a corresponding manner as done for the relay logical channel and relay logical channel groups. In particular, the relay/remote logical channel groups are pre-defined (e.g. four remote respectively legacy (relay) logical channel groups), and the eNodeB assigns the relay/remote logical channels to the corresponding relay/remote logical channel groups such that similar priorities (QoS) are grouped in one logical channel group.

Then, when triggered for buffer status reporting and generating the buffer status reports in the relay UE, a relay buffer status report would report the amount of relay data over all relay logical channels by comprising a buffer status field for each relay logical channel group, this buffer status field indicating the amount of relay data available for transmission to the radio base station across all relay logical channels of said particular relay logical channel group (see also BSR reporting described in the background section). Likewise, a remote buffer status report would be generated by the relay UE so as to report on the amount of remote data over all remote logical channels, by comprising a buffer status field for each remote logical channel group, this buffer status field indicating the amount of remote data available for transmission to the radio base station across all remote logical channels of said particular remote logical channel group.

The format and content of the remote buffer status report can be in a corresponding manner as the usual legacy relay buffer status report, e.g. a long or short BSR as explained in detail in the background section, where the long BSR comprises four buffer size fields corresponding to the four LCGs, and the short BSR includes one buffer size field for one LCG. Alternatively, a different format can be foreseen for the remote buffer status report, e.g. only including a buffer size field for a remote logical channel group which remote logical channels indeed carry remote data (i.e. no buffer size field indicating zero data).

Therefore, the relay UE can distinguish between relay data and remote data according to the buffer status reports.

Furthermore, the two buffer status reports can be provided in the same or in separate MAC CEs. In case of using separate MAC CEs, a new MAC control element containing the remote buffer status report is introduced. According to one exemplary implementation, the priority of the new MAC CE carrying the remote buffer status report needs to be defined when generating a MAC PDU. Following one implementation the MAC CE carrying the remote BSR is prioritized over the MAC CE carrying the relay BSR, when performing the LCP procedure. According to another alternative implementation, the relay UE reports always both the remote buffer status and the relay buffer status, e.g. by including both MAC CEs, when a BSR has been triggered. For the case that the two buffer status report are transmitted in one common MAC CE, some new MAC CE needs to be defined which carries buffer status information for all Logical channel groups, i.e. remote logical channel groups and relay logical channel groups. For example, the new BSR MAC CE would carry buffer status information for the 8 LCGs.

According to one implementation, there is a common BSR procedure for the remote and relay bearers (logical channels). Correspondingly, there would be one set of BSR-related timers/counters. Some new trigger events for reporting the remote BSR may be introduced, which can be defined in the same way as for the legacy relay logical channels/bearers. For example a remote BSR may be triggered for the case UL data, for a remote logical channel which belongs to a remote LCG, becomes available for transmission in the RLC entity or in the PDCP entity and either the data belongs to a remote logical channel with higher priority than the priorities of the remote logical channels which belong to any remote LCG and for which data is already available for transmission, or there is no data available for transmission for any of the remote logical channels which belong to a remote LCG. Similar triggering events as described in the technical background section could be defined for the remote BSR.

Upon generating the different relay/remote buffer status reports, the relay UE will transmit them to the eNodeB which then can use the information provided in the two reports so as to determine the radio resources to be assigned to the relay UE. A corresponding uplink resource grant (e.g. DCI of Format 0), addressed to the C-RNTI of the relay UE, can be prepared by the eNodeB and transmitted over the (E)-PDCCH to the relay UE indicating the radio resources which the relay UE may use to transmit the relay and/or remote data to the eNodeB. As explained in the background section, in general a logical channel prioritization procedure is used by (relay) UEs to generate the uplink data when receiving an uplink resource grant.

Correspondingly, according to one implementation of the second embodiment, the relay UE, upon receiving the above-mentioned uplink resource grant from the eNodeB, may perform such a logical channel prioritization, LCP, procedure to prepare and generate the uplink data. In particular, the LCP procedure performed by the relay UE will distribute the indicated radio resources to both the remote logical channels and the relay logical channels having data available for transmission to the eNodeB. In a corresponding 3GPP implementation of this second embodiment, the (common) LCP procedure might otherwise work as described in detail in the background section and the various technical 3GPP standards. For instance, the relay and remote logical channels may be considered during the common LCP procedure in a decreasing order of their corresponding logical channel priority. In addition, in case that a remote logical channel has the same logical channel priority as a relay logical channel, the relay UE may prioritize during the LCP procedure the remote logical channel over the relay logical channel, or vice versa. Correspondingly, the LCP procedure would first assign radio resources to the remote logical channel and then (if radio resources are still available to be distributed) to the relay logical channel. As a result, a MAC PDU (transport block) is generated by the common LCP procedure possibly comprising relay data and remote data (in addition to possible further control data, e.g. MAC CEs). The thus generated transport block will then be transmitted by the relay UE to the eNodeB using the indicated uplink resources.

According to some alternative implementation of the second embodiment, the remote logical channels could be served first by the common LCP procedure before serving then the relay logical channel. As a consequence, any remote data will be transmitted in the MAC PDU before relay data could be transmitted.

Figure 16:
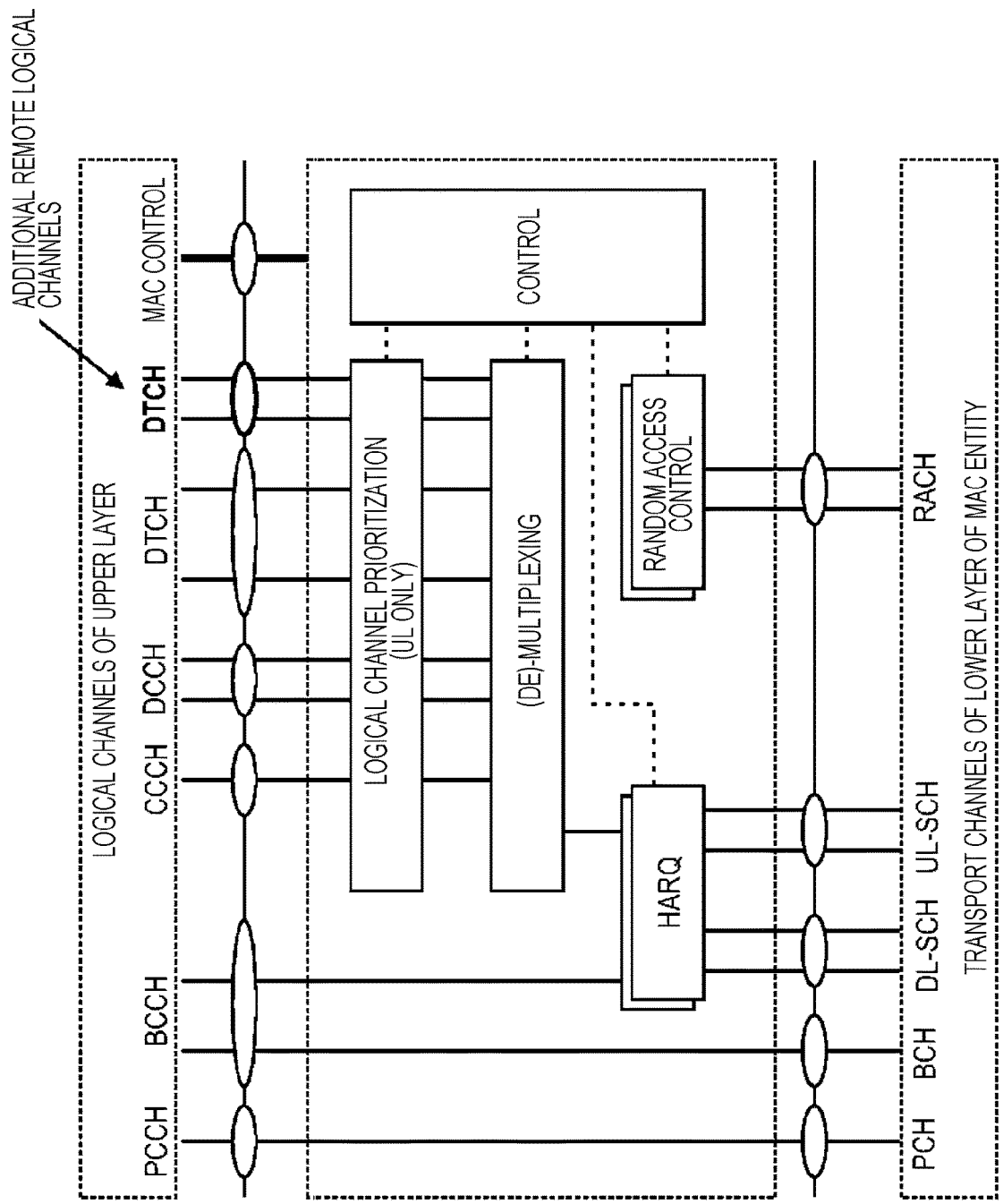
FIG. 16 shows the structure of a Mac entity for the relay UE according to an exemplary implementation of the second embodiment.

A further difference to the second embodiment is that no further additional MAC entity is provided in the relay UE to handle separately the remote data. As apparent from FIG. 16, a single MAC entity is provided in the relay UE which however is extended to handle additional remote logical channels (in bold in FIG. 16, DTCH, data radio bearers). For instance, there could be only one remote logical channel which would carry all remote data between relay UE and eNodeB. Alternatively, a one-to-one mapping can be configured such that for each remote sidelink logical channel set up between the relay UE and a remote UE, a corresponding remote logical channel between the relay UE and the eNodeB is configured, further linking these two together in a one-to-one manner. Correspondingly, remote data carried by a remote logical channel would be multiplexed to the corresponding remote sidelink logical channel, and vice versa.

Still alternatively, a remote logical channel can be configured per QoS priority (per QCI) that is to be fulfilled for existing remote data communication. In particular, the relay UE and eNodeB will set up remote logical channels based on the QoS requirements that need to be fulfilled for the transmission/relaying of the remote data. In any case, one variant of the second embodiment includes the definition of further logical channel IDs (DRB IDs) for use in connection with relaying of remote data. Eight different DRB IDs are currently defined in the 3GPP standard. For example, additional eight DRB IDs (for the remote DTCHs) could be foreseen to distinguish between the remote logical channels.

In the same manner as for the first embodiment, according to one implementation of the second embodiment, a particular QoS/priority-based mapping between remote logical channels and remote sidelink logical channels is provided. In more detail, in the uplink, n-to-1 mapping rules can be defined which map the remote sidelink logical channels of a particular priority or QoS requirement to the one corresponding remote logical channel of said same or similar particular priority or QoS requirement. In consequence, remote data received in the relay UE from one or more remote UEs having the same or similar priority or QoS requirement, will be multiplexed to a remote logical channel being associated with the same or similar priority and thus being able to fulfill the corresponding QoS requirements.

Conversely, in the downlink, 1-to-n mapping rules can be defined which map one particular remote logical channel of a particular priority or QoS requirement to those corresponding remote sidelink logical channels (to one ore more remote UEs) having the same or similar particular priority or QoS requirement. In consequence, remote data received in the real UE from the radio base station will be demultiplexed to the various remote sidelink logical channels (to one or more remote UEs) being associated with the same or similar priority and thus being able to fulfill the corresponding QoS requirements.

These mapping rules are illustrated in FIG. 15, illustrating a n-to-1 and 1-to-n mapping performed by the relay UE, as explained above.

Third Embodiment

The following third embodiment, and different variants and implementations thereof, will be explained for solving one or more of the above discussed problems. Similar assumptions can be made as for the first two embodiments such as having a relay UE being in communication with an eNodeB and serving as the relay for one or more remote UEs. Consequently, one or more suitable sidelink remote logical channels are set up between the relay UE and each remote UE so as to carry the remote data between the two UEs. In addition, one or more remote logical channels can be established between the relay UE and the eNodeB for carrying the remote data. Furthermore, it is assumed that also the relay UE actively communicates with the radio base station by exchanging relay data (i.e. data originating from or destined to the relay UE) by using corresponding (relay) logical channels set up between the relay UE and the radio base station.

According to the third embodiment, all remote sidelink logical channels/radio bearer, i.e. sidelink logical channels/ radio bearer between the one or more remote UE(s) and the relay UE, will be mapped to one remote logical channel on the Uu interface between relay UE and the eNodeB. More in particular, in this case all remote data will be transmitted via the same logical channel/radio bearer between the relay UE and the eNodeB. According to one implementation of the embodiment, this single remote logical channel will be mapped to a reserved legacy logical channel group. More in particular, one of the 4 LCGs defined will be reserved/only used for/by the remote logical channel. This ensures that the buffer status reporting is separate for the remote and relay data. Furthermore the single remote logical channel is given according to one implementation of the embodiment the highest priority among all configured logical channels in the relay UE. As a consequence when generating a MAC PDU during the LCP procedure, the remote data will be treated with the highest priority.

Further improvements applicable to all three embodiments relate to the resource allocation mode used on the PC 5 interface in such a relay scenario. In particular, in such relay scenarios the remote UE is/shall not be in the coverage of the eNodeB. Consequently, there is no point in scheduling the ProSe direct communication resources by the eNodeB. Rather, only the UE-autonomous resource allocation mode should be used for the ProSe communication and discovery between the relay UE and the remote UE.

In order to allow the UE autonomous resource allocation mode ProSe communication and/or discovery, the relay UE should inform the remote UE(s) of the communication pools/discovery pools used for the UE autonomous resource allocation mode (optionally, also the discovery pools for Type 1 discovery). This pool information is according to one implementation provided by eNB to the relay UE. Alternatively, the remote UE could be considered as operating as an out-of-coverage REL-12 ProSe-enabled UE, which in consequence means, that preconfigured pools are used for ProSe communication/discovery.

Some further improvement applicable to the three embodiments is related to the transmission of RRC respectively NAS signaling, e.g. paging messages or handover commands, over the PC5 interface between the Relay UE and the one or more remote UEs. In order to support this, the sidelink logical channels/radio bearer need to be established which carries the control signaling like RRC signaling respectively NAS signaling or any other higher layer control signaling.

Further Embodiments

According to a first variant, a method is provided for scheduling radio resources for a relay user equipment in a mobile communication system. The relay user equipment supports a relay functionality for being capable to serve as a relay, respectively for one or more remote user equipments, such that remote data, originating from or destined to the one or more remote user equipments, is relayed by the relay user equipment between the one or more remote user equipments and a radio base station. A remote scheduling identification is configured for addressing one or more remote logical channels carrying the remote data between the relay user equipment and the radio base station. A relay scheduling identification is configured for addressing one or more relay logical channels carrying relay data, originating from or destined to the relay user equipment, between the relay user equipment and the radio base station. The method comprises the following steps performed by the relay user equipment. The relay UE receives, from the radio base station, a remote resource assignment, assigning radio resources to the relay user equipment for exchanging the remote data with the radio base station, where the remote resource assignment is addressed to the remote scheduling identification. The relay UE further receives, from the radio base station, a relay resource assignment, assigning radio resources to the relay user equipment for exchanging the relay data with the radio base station, where the relay resource assignment is addressed to the relay scheduling identification.

According to a second variant provided in addition to the first variant, a relay Medium Access Control, MAC, entity and a remote MAC entity are configured in the relay user equipment, the relay MAC entity being associated with the relay logical channels for handling the relay data, and the remote MAC entity being associated with the remote logical channels for handling the remote data. The remote scheduling identification is associated with the remote logical channels and/or with the remote MAC entity, and the relay scheduling identification is associated with the relay logical channels and/or with the relay MAC entity. Optionally, a Hybrid Automatic Repeat Request, HARQ, entity is shared between the remote MAC entity and the relay MAC entity for providing retransmission control to transmissions of the remote data and transmissions of the relay data, or the remote MAC entity comprises a remote HARQ entity and the relay MAC entity comprises a relay HARQ entity. Optionally, relay logical channel groups are defined for the relay MAC entity, each of the relay logical channels being assigned to one of the relay logical channel groups, and wherein remote logical channel groups are defined for the remote MAC entity, each of the remote logical channels being assigned to one of the remote logical channel groups. Optionally, relay logical channel IDs are defined for the relay MAC entity, each of the relay logical channels being assigned one of the relay logical channel IDs, and wherein remote logical channel IDs are defined for the remote MAC entity, each of the remote logical channels being assigned one of the remote logical channel IDs.

According to a third variant provided in addition to the first or second variant, the method comprises the following steps performed by the relay user equipment. A remote logical channel prioritization, LCP, procedure is performed by the relay UE so as to allocate the radio resources assigned in the remote resource assignment to the remote logical channels that have the remote data available for transmission to the radio base station. Advantageously, one or more transport blocks carrying the remote data are thereby generated. In addition, or alternatively, a relay logical channel prioritization, LCP, procedure is performed so as to allocate the radio resources assigned in the relay resource assignment to the relay logical channels that have the relay data available for transmission to the radio base station. Advantageously one or more transport blocks carrying the relay data are thereby generated.

According to a fourth variant provided in addition to the first, second or third variant, the method comprises the following steps performed by the relay user equipment. A relay buffer status report is generated based on the amount of the relay data buffered at the relay user equipment to be transmitted to the radio base station. A remote buffer status report is generated by the relay UE based on the amount of the remote data buffered at the relay user equipment to be transmitted to the radio base station. Both the relay buffer status report and the remote buffer status report are transmitted to the radio base station.

According to a fifth variant provided in addition to any of the first to fourth variants, at least one remote sidelink logical channel is established between the relay user equipment and respectively each of the one or more remote user equipments for respectively carrying the remote data. The relay user equipment multiplexes each of the at least one remote sidelink logical channel of a first logical channel priority to that remote logical channel of the corresponding same or similar first logical channel priority. In addition or alternatively, the relay UE demultiplexes the remote logical channel of a first logical channel priority to those remote sidelink logical channels of the corresponding same or similar first logical channel priority.

According to a 6th variant provided in addition to any of the first to fifth variants, the remote and relay scheduling identification can be one of a cell radio network temporary identifier, C-RNTI, a semi-persistent scheduling C-RNTI, SPS C-RNTI, or an MBMS RNTI, M-RNTI.

According to a 7th variant provided in addition to any of the first to 6th variants, the relay user equipment is connected to the radio base station via one cell, and the radio base station issues one resource assignment per transmission time interval, be it the remote resource assignment or the relay resource assignment. Alternatively, the relay user equipment is connected to the radio base station via at least two cells, wherein the remote data and the relay data are transmitted to the radio base station via different cells.

According to an 8th variant, a relay user equipment is provided for being scheduled with radio resources. The relay user equipment supports a relay functionality for being capable to serve as a relay, respectively for one or more remote user equipments, such that remote data, originating from or destined to the one or more remote user equipments, is relayed by the relay user equipment between the one or more remote user equipments and a radio base station. A remote scheduling identification is configured for addressing one or more remote logical channels carrying the remote data between the relay user equipment and the radio base station. A relay scheduling identification is configured for addressing one or more relay logical channels carrying relay data, originating from or destined to the relay user equipment, between the relay user equipment and the radio base station. A receiver of the relay UE receives from the radio base station, a remote resource assignment, assigning radio resources to the relay user equipment for exchanging the remote data with the radio base station, where the remote resource assignment is addressed to the remote scheduling identification. The receiver of the relay UE receives from the radio base station, a relay resource assignment, assigning radio resources to the relay user equipment for exchanging the relay data with the radio base station, where the relay resource assignment is addressed to the relay scheduling identification.

According to a 9th variant provided in addition to the 8th variant, the relay UE comprises a relay Medium Access Control, MAC, entity and a remote MAC entity, the relay MAC entity being associated with the relay logical channels for handling the relay data, and the remote MAC entity being associated with the remote logical channels for handling the remote data. The remote scheduling identification is associated with the remote logical channels and/or with the remote MAC entity, and the relay scheduling identification is associated with the relay logical channels and/or with the relay MAC entity. Optionally, a Hybrid Automatic Repeat Request, HARQ, entity is shared between the remote MAC entity and the relay MAC entity for providing retransmission control to transmissions of the remote data and transmissions of the relay data, or the remote MAC entity comprises a remote HARQ entity and the relay MAC entity comprises a relay HARQ entity. Optionally, relay logical channel groups are defined for the relay MAC entity, each of the relay logical channels being assigned to one of the relay logical channel groups, and wherein remote logical channel groups are defined for the remote MAC entity, each of the remote logical channels being assigned to one of the remote logical channel groups. Optionally, relay logical channel IDs are defined for the relay MAC entity, each of the relay logical channels being assigned one of the relay logical channel IDs, and wherein remote logical channel IDs are defined for the remote MAC entity, each of the remote logical channels being assigned one of the remote logical channel IDs.

According to a 10th variant provided in addition to the 8th or 9th variant, a processor of the relay UE performs a remote logical channel prioritization, LCP, procedure so as to allocate the radio resources assigned in the remote resource assignment to the remote logical channels that have the remote data available for transmission to the radio base station, preferably thereby generating one or more transport blocks carrying the remote data. In addition or alternatively, the processor of the relay UE performs a relay logical channel prioritization, LCP, procedure so as to allocate the radio resources assigned in the relay resource assignment to the relay logical channels that have the relay data available for transmission to the radio base station, preferably thereby generating one or more transport blocks carrying the relay data.

According to an 11th variant provided in addition to any of the 8th to 10th variants, a processor of the relay UE generates a relay buffer status report based on the amount of the relay data buffered at the relay user equipment to be transmitted to the radio base station. The processor generates a remote buffer status report based on the amount of the remote data buffered at the relay user equipment to be transmitted to the radio base station. A transmitter of the relay UE transmits the relay buffer status report and the remote buffer status report to the radio base station.

According to a 12th variant provided in addition to any of the 8th to 11th variants, at least one remote sidelink logical channel is established between the relay user equipment and respectively each of the one or more remote user equipments for respectively carrying the remote data. A multiplexer of the relay UE multiplexes each of the at least one remote sidelink logical channel of a first logical channel priority to that remote logical channel of the corresponding same or similar first logical channel priority. In addition or alternatively, a demultiplexer of the relay UE demultiplexes the remote logical channel of a first logical channel priority to those remote sidelink logical channels of the corresponding same or similar first logical channel priority.

According to a 13th variant, a radio base station is provided for scheduling radio resources for a relay user equipment in a mobile communication system. The relay user equipment supports a relay functionality for being capable to serve as a relay, respectively for one or more remote user equipments, such that remote data, originating from or destined to the one or more remote user equipments, is relayed by the relay user equipment between the one or more remote user equipments and the radio base station. A remote scheduling identification is configured for addressing one or more remote logical channels carrying the remote data between the relay user equipment and the radio base station. A relay scheduling identification is configured for addressing one or more relay logical channels carrying relay data, originating from or destined to the relay user equipment, between the relay user equipment and the radio base station. A processor of the radio base station generates a remote resource assignment, assigning radio resources to the relay user equipment for exchanging the remote data with the radio base station, where the remote resource assignment is addressed to the remote scheduling identification. The processor generates a relay resource assignment, assigning radio resources to the relay user equipment for exchanging the relay data with the radio base station, where the relay resource assignment is addressed to the relay scheduling identification. A transmitter of the radio base station transmits the remote resource assignment and/or the relay resource assignment to the relay UE.

According to a 14th variant provided in addition to the 13th variant, a receiver of the radio base station receives a relay buffer status report from the relay user equipment, indicating the amount of the relay data buffered at the relay user equipment to be transmitted to the radio base station. The receiver further receives a remote buffer status report from the relay user equipment indicating the amount of the remote data buffered at the relay user equipment to be transmitted to the radio base station. The processor considers the relay buffer status report and the remote buffer status report when generating the remote resource assignment and/or the relay resource assignment.

According to a 15th variant, a method is provided for scheduling radio resources for a relay user equipment in a mobile communication system. The relay user equipment supports a relay functionality for being capable to serve as a relay, respectively for one or more remote user equipments, such that remote data, originating from or destined to the one or more remote user equipments, is relayed by the relay user equipment between the one or more remote user equipments and a radio base station. One or more relay logical channels are established for carrying relay data, originating from or destined to the relay user equipment, between the relay user equipment and the radio base station. One or more remote logical channels are established for carrying remote data, originating from or destined to the one or more remote user equipments, between the relay user equipment and the radio base station. Relay logical channel groups are defined, wherein each of the relay logical channels is assigned to one of the relay logical channel groups. Remote logical channel groups are defined, wherein each of the remote logical channels is assigned to one of the remote logical channel groups. The method comprises the following steps performed by the relay user equipment. A relay buffer status report is generated by the relay UE comprising one buffer size field for a relay logical channel group, the one buffer size field indicating the total amount of relay data available for transmission across all relay logical channels of said relay logical channel group. A remote buffer status report is generated by the relay UE comprising one buffer size field for a remote logical channel group, the one buffer size field indicating the total amount of remote data available for transmission across all remote logical channels of said remote logical channel group. The relay buffer status report and the remote buffer status report are transmitted to the radio base station. The relay UE receives from the radio base station, an uplink resource assignment, assigning radio resources to the relay user equipment for transmitting the remote data and the relay data to the radio base station, the uplink resource assignment being generated by the radio base station based on the relay buffer status report and the remote buffer status report.

According to a 16th variant provided in addition to the 15th variant, a Medium Access Control, MAC, entity is configured in the relay user equipment, the MAC entity being associated with the relay logical channels and the remote logical channels for handling the remote data and the relay data. Optionally, relay logical channel IDs are defined for the MAC entity, each of the relay logical channels being assigned one of the relay logical channel IDs, and wherein remote logical channel IDs are defined for the MAC entity, each of the remote logical channels being assigned one of the remote logical channel IDs.

According to a 17th variant provided in addition to the 15th or 16th variant, a logical channel prioritization, LCP, procedure is performed by the relay UE so as to allocate the radio resources assigned in the uplink resource assignment 1) to the remote logical channels that have the remote data available for transmission to the radio base station and 2) to the relay logical channels that have the relay data available for transmission to the radio base station, preferably thereby generating one or more transport blocks carrying the remote data and the relay data. Optionally, radio resources are allocated, during the LCP procedure, to the relay logical channels and the remote logical channels, with data available for transmission, in a decreasing order of a logical channel priority with which each of the relay logical channels and the remote logical channels is associated. Optionally, during the LCP procedure, a remote logical channel having a particular logical channel priority is prioritized by the relay UE over a relay logical channel having the same particular logical channel priority.

According to an 18th variant provided in addition to any of the 15th to 17th variants, at least one remote sidelink logical channel is established between the relay user equipment and respectively each of the one or more remote user equipments for respectively carrying the remote data. The relay UE multiplexes each of the at least one remote sidelink logical channel of a first logical channel priority to that remote logical channel of the corresponding same or similar first logical priority. In addition, or alternatively, the relay UE demultiplexes the remote logical channel of a first logical channel priority to those remote sidelink logical channels of the corresponding same or similar first logical channel priority.

According to a 19th variant in addition to any of the 15th to 18th variants, a first Medium Access Control Control Element, MAC CE, carrying the remote buffer status report, is prioritized over a second MAC CE, carrying the relay buffer status report during a logical channel prioritization, LCP, procedure performed so as to allocate the radio resources assigned in the uplink resource assignment to the remote logical channels and the relay logical channels.

According to a 20th variant, a relay user equipment is provided for being scheduled with radio resources. The relay user equipment supports a relay functionality for being capable to serve as a relay, respectively for one or more remote user equipments, such that remote data, originating from or destined to the one or more remote user equipments, is relayed by the relay user equipment between the one or more remote user equipments and a radio base station. One or more relay logical channels are established for carrying relay data, originating from or destined to the relay user equipment, between the relay user equipment and the radio base station. One or more remote logical channels are established for carrying remote data, originating from or destined to the one or more remote user equipments, between the relay user equipment and the radio base station. Relay logical channel groups are defined, wherein each of the relay logical channels is assigned to one of the relay logical channel groups. Remote logical channel groups are defined, wherein each of the remote logical channels is assigned to one of the remote logical channel groups. A processor of the relay UE generates a relay buffer status report comprising one buffer size field a relay logical channel group, the one buffer size field indicating the total amount of relay data available for transmission across all relay logical channels of said relay logical channel group. The processor further generates a remote buffer status report comprising one buffer size field for a remote logical channel group, the one buffer size field indicating the total amount of remote data available for transmission across all remote logical channels of said remote logical channel group. A transmitter of the relay UE transmits the relay buffer status report and the remote buffer status report to the radio base station. A receiver of the relay UE receives, from the radio base station, an uplink resource assignment, assigning radio resources to the relay user equipment for transmitting the remote data and the relay data to the radio base station, the uplink resource assignment being generated by the radio base station based on the relay buffer status report and the remote buffer status report.

According to a 21st variant provided in addition to the 20th variant, the relay UE comprises a Medium Access Control, MAC, entity being associated with the relay logical channels and the remote logical channels for handling the remote data and the relay data. Optionally, relay logical channel IDs are defined for the MAC entity, each of the relay logical channels being assigned one of the relay logical channel IDs, and wherein remote logical channel IDs are defined for the MAC entity, each of the remote logical channels being assigned one of the remote logical channel IDs.

According to a 22nd variant provided in addition to the 20th or 21st variant, the processor performs a logical channel prioritization, LCP, procedure so as to allocate the radio resources assigned in the uplink resource assignment 1) to the remote logical channels that have the remote data available for transmission to the radio base station and 2) to the relay logical channels that have the relay data available for transmission to the radio base station, preferably thereby generating one or more transport blocks carrying the remote data and the relay data. Optionally, the processor further allocates radio resources, during the LCP procedure, to the relay logical channels and the remote logical channels, with data available for transmission, in a decreasing order of a logical channel priority with which each of the relay logical channels and the remote logical channels is associated.

According to a 23rd variant provided in addition to any of the 20th to 22nd variant, at least one remote sidelink logical channel is established between the relay user equipment and respectively each of the one or more remote user equipments for respectively carrying the remote data. A multiplexer of the relay UE multiplexes each of the at least one remote sidelink logical channel of a first logical channel priority to that remote logical channel of the corresponding same or similar first logical channel priority. In addition or alternatively, a demultiplexer of the relay UE demultiplexes the remote logical channel of a first logical channel priority to those remote sidelink logical channels of the corresponding same or similar first logical channel priority.

According to a 24th variant provided in addition to any of the 20th to 23rd variants, the processor prioritizes a first Medium Access Control Control Element, MAC CE, carrying the remote buffer status report, over a second MAC CE, carrying the relay buffer status report during a logical channel prioritization, LCP, procedure performed so as to allocate the radio resources assigned in the uplink resource assignment to the remote logical channels and the relay logical channels.

According to a 25th variant, a radio base station is provided for scheduling radio resources for a relay user equipment in a mobile communication system. The relay user equipment supports a relay functionality for being capable to serve as a relay, respectively for one or more remote user equipments, such that remote data, originating from or destined to the one or more remote user equipments, is relayed by the relay user equipment between the one or more remote user equipments and the radio base station. One or more relay logical channels are established for carrying relay data, originating from or destined to the relay user equipment, between the relay user equipment and the radio base station. One or more remote logical channels are established for carrying remote data, originating from or destined to the one or more remote user equipments, between the relay user equipment and the radio base station.

Relay logical channel groups are defined, wherein each of the relay logical channels is assigned to one of the relay logical channel groups. Remote logical channel groups are defined, wherein each of the remote logical channels is assigned to one of the remote logical channel groups. A receiver of the radio base station receives a relay buffer status report comprising one buffer size field for a relay logical channel group, the one buffer size field indicating the total amount of relay data available for transmission across all relay logical channels of said relay logical channel group. The receiver further receives a remote buffer status report comprising one buffer size field for a remote logical channel group, the one buffer size field indicating the total amount of remote data available for transmission across all remote logical channels of said remote logical channel group. A processor of the radio base station generates an uplink resource assignment, assigning radio resources to the relay user equipment for transmitting the remote data and the relay data to the radio base station, the uplink resource assignment being generated by the processor based on the relay buffer status report and the remote buffer status report. A transmitter of the radio base station transmits the generated uplink resource assignment to the relay UE.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

What is claimed is:

1. A method for scheduling radio resources for a relay user equipment in a mobile communication system, wherein the relay user equipment supports a relay functionality for being capable to serve as a relay, respectively for one or more remote user equipments, such that remote data, originating from or destined to the one or more remote user equipments, is relayed by the relay user equipment between the one or more remote user equipments and a radio base station, the method comprising:

receiving, by the relay user equipment, from the radio base station, a remote resource assignment, assigning radio resources to the relay user equipment for exchanging the remote data with the radio base station, wherein the remote resource assignment is addressed to a remote scheduling identification configured for addressing one or more remote logical channels carrying the remote data between the relay user equipment and the radio base station; and receiving, by the relay user equipment, from the radio base station, a relay resource assignment, assigning radio resources to the relay user equipment for exchanging the relay data with the radio base station, wherein the relay resource assignment is addressed to a relay scheduling identification configured for addressing one or more relay logical channels carrying the relay data, originating from or destined to the relay user equipment, between the relay user equipment and the radio base station;

generating, by the relay user equipment, a relay buffer status report based on the amount of the relay data buffered at the relay user equipment to be transmitted to the radio base station;

generating, by the relay user equipment, a remote buffer status report based on the amount of the remote data buffered at the relay user equipment to be transmitted to the radio base station; and transmitting, by the relay user equipment the relay buffer status report and the remote buffer status report to the radio base station.

2. The method according to claim 1, wherein:

a relay Medium Access Control, MAC, entity and a remote MAC entity are configured in the relay user equipment, the relay MAC entity being associated with the relay logical channels for handling the relay data, and the remote MAC entity being associated with the remote logical channels for handling the remote data, and the remote scheduling identification is associated with the remote logical channels and/or with the remote MAC entity, and the relay scheduling identification is associated with the relay logical channels and/or with the relay MAC entity.

3. The method according to claim 2, wherein:

a Hybrid Automatic Repeat Request, HARQ, entity is shared between the remote MAC entity and the relay MAC entity for providing retransmission control to transmissions of the remote data and transmissions of the relay data, or the remote MAC entity comprises a remote HARQ entity and the relay MAC entity comprises a relay HARQ entity, relay logical channel groups are defined for the relay MAC entity, each of the relay logical channels being assigned to one of the relay logical channel groups, and wherein remote logical channel groups are defined for the remote MAC entity, each of the remote logical channels being assigned to one of the remote logical channel groups, or relay logical channel IDs are defined for the relay MAC entity, each of the relay logical channels being assigned one of the relay logical channel IDs, and wherein remote logical channel IDs are defined for the remote MAC entity, each of the remote logical channels being assigned one of the remote logical channel IDs.

4. The method according to claim 1, further comprising:

performing, by the relay user equipment, a remote logical channel prioritization, LCP, procedure so as to allocate the radio resources assigned in the remote resource assignment to the remote logical channels that have the remote data available for transmission to the radio base station; and/or performing, by the relay user equipment, a relay logical channel prioritization, LCP, procedure so as to allocate the radio resources assigned in the relay resource assignment to the relay logical channels that have the relay data available for transmission to the radio base station.

5. The method according to claim 4, comprising:

generating one or more transport blocks carrying the remote data; and generating one or more transport blocks carrying the relay data.

6. The method according to claim 1, wherein at least one remote sidelink logical channel is established between the relay user equipment and respectively each of the one or more remote user equipments for respectively carrying the remote data, the method comprising:

multiplexing, by the relay user equipment, each of the at least one remote sidelink logical channel of a first logical channel priority to that remote logical channel of the corresponding same or similar first logical channel priority, and/or demultiplexing, by the relay user equipment, the remote logical channel of a first logical channel priority to those remote sidelink logical channels of the corresponding same or similar first logical channel priority.

7. A relay user equipment for being scheduled with radio resources, wherein the relay user equipment supports a relay functionality for being capable to serve as a relay, respectively for one or more remote user equipments, such that remote data, originating from or destined to the one or more remote user equipments, is relayed by the relay user equipment between the one or more remote user equipments and a radio base station, the relay user equipment comprising:

a receiver configured to receive from the radio base station, a remote resource assignment, assigning radio resources to the relay user equipment for exchanging the remote data with the radio base station, wherein the remote resource assignment is addressed to a remote scheduling identification configured for addressing one or more remote logical channels carrying the remote data between the relay user equipment and the radio base station, the receiver being configured to receive from the radio base station, a relay resource assignment, assigning radio resources to the relay user equipment for exchanging the relay data with the radio base station, wherein the relay resource assignment is addressed to a relay scheduling identification configured for addressing one or more relay logical channels carrying relay data, originating from or destined to the relay user equipment, between the relay user equipment and the radio base station;

a processor configured to generate a relay buffer status report based on the amount of the relay data buffered at the relay user equipment to be transmitted to the radio base station, and generate a remote buffer status report based on the amount of the remote data buffered at the relay user equipment to be transmitted to the radio base station; and a transmitter configured to transmit the relay buffer status report and the remote buffer status report to the radio base station.

8. The relay user equipment according to claim 7, comprising, a relay Medium Access Control, MAC, entity; and a remote MAC entity, the relay MAC entity being associated with the relay logical channels for handling the relay data, and the remote MAC entity being associated with the remote logical channels for handling the remote data, wherein the remote scheduling identification is associated with the remote logical channels and/or with the remote MAC entity, and the relay scheduling identification is associated with the relay logical channels and/or with the relay MAC entity.

9. The relay user equipment according to claim 8, wherein:

a Hybrid Automatic Repeat Request, HARQ, entity is shared between the remote MAC entity and the relay MAC entity for providing retransmission control to transmissions of the remote data and transmissions of the relay data, or the remote MAC entity comprises a remote HARQ entity and the relay MAC entity comprises a relay HARQ entity, relay logical channel groups are defined for the relay MAC entity, each of the relay logical channels being assigned to one of the relay logical channel groups, and wherein remote logical channel groups are defined for the remote MAC entity, each of the remote logical channels being assigned to one of the remote logical channel groups, or relay logical channel IDs are defined for the relay MAC entity, each of the relay logical channels being assigned one of the relay logical channel IDs, and wherein remote logical channel IDs are defined for the remote MAC entity, each of the remote logical channels being assigned one of the remote logical channel IDs.

10. The relay user equipment according to claim 7, wherein the processor is, configured to perform a remote logical channel prioritization, LCP, procedure so as to allocate the radio resources assigned in the remote resource assignment to the remote logical channels that have the remote data available for transmission to the radio base station.

11. The relay user equipment according to claim 10, wherein the processor is configured to:

generate one or more transport blocks carrying the remote data, and perform a relay logical channel prioritization, LCP, procedure so as to allocate the radio resources assigned in the relay resource assignment to the relay logical channels that have the relay data available for transmission to the radio base station, thereby generating one or more transport blocks carrying the relay data.

12. A method for scheduling radio resources for a relay user equipment in a mobile communication system, wherein the relay user equipment supports a relay functionality for being capable to serve as a relay, respectively for one or more remote user equipments, such that remote data, originating from or destined to the one or more remote user equipments, is relayed by the relay user equipment between the one or more remote user equipments and a radio base station, wherein one or more relay logical channels are established for carrying relay data, originating from or destined to the relay user equipment, between the relay user equipment and the radio base station, wherein one or more remote logical channels are established for carrying remote data, originating from or destined to the one or more remote user equipments, between the relay user equipment and the radio base station, wherein relay logical channel groups are defined, wherein each of the relay logical channels is assigned to one of the relay logical channel groups, and wherein remote logical channel groups are defined, wherein each of the remote logical channels is assigned to one of the remote logical channel groups, the method comprising:

generating, by the relay user equipment, a relay buffer status report comprising one buffer size field for a relay logical channel group, the one buffer size field indicating the total amount of relay data available for transmission across all relay logical channels of said relay logical channel group;

generating, by the relay user equipment, a remote buffer status report comprising one buffer size field for a remote logical channel group, the one buffer size field indicating the total amount of remote data available for transmission across all remote logical channels of said remote logical channel group;

transmitting, by the relay user equipment, the relay buffer status report and the remote buffer status report to the radio base station; and receiving, by the relay user equipment, from the radio base station, an uplink resource assignment, assigning radio resources to the relay user equipment for transmitting the remote data and the relay data to the radio base station, the uplink resource assignment being generated by the radio base station based on the relay buffer status report and the remote buffer status report.

13. The method according to claim 12, wherein a Medium Access Control, MAC, entity is configured in the relay user equipment, the MAC entity being associated with the relay logical channels and the remote logical channels for handling the remote data and the relay data.

14. The method according to claim 13, wherein relay logical channel IDs are defined for the MAC entity, each of the relay logical channels being assigned one of the relay logical channel IDs, and wherein remote logical channel IDs are defined for the MAC entity, each of the remote logical channels being assigned one of the remote logical channel IDs.

15. The method according to claim 12, further comprising:

performing, by the relay user equipment, a logical channel prioritization, LCP, procedure so as to allocate the radio resources assigned in the uplink resource assignment to the remote logical channels that have the remote data available for transmission to the radio base station and to the relay logical channels that have the relay data available for transmission to the radio base station.

16. The method according to claim 15, further comprising:
> generating one or more transport blocks carrying the remote data and the relay data,
> allocating radio resources, during the LCP procedure, to the relay logical channels and the remote logical channels, with data available for transmission, in a decreasing order of a logical channel priority with which each of the relay logical channels and the remote logical channels is associated, and
> prioritizing, by the relay user equipment, during the LCP procedure, a remote logical channel having a particular logical channel priority over a relay logical channel having the same particular logical channel priority.

17. The method according to claim 12, wherein at least one remote sidelink logical channel is established between the relay user equipment and respectively each of the one or more remote user equipments for respectively carrying the remote data, the method comprising:
> multiplexing, by the relay user equipment, each of the at least one remote sidelink logical channel of a first logical channel priority to that remote logical channel of the corresponding same or similar first logical priority; and/or
> demultiplexing, by the relay user equipment, the remote logical channel of a first logical channel priority to those remote sidelink logical channels of the corresponding same or similar first logical channel priority.

18. A relay user equipment for being scheduled with radio resources,
> wherein the relay user equipment supports a relay functionality for being capable to serve as a relay, respectively for one or more remote user equipments, such that remote data, originating from or destined to the one or more remote user equipments, is relayed by the relay user equipment between the one or more remote user equipments and a radio base station,
> wherein one or more relay logical channels are established for carrying relay data, originating from or destined to the relay user equipment, between the relay user equipment and the radio base station,
> wherein one or more remote logical channels are established for carrying remote data, originating from or destined to the one or more remote user equipments, between the relay user equipment and the radio base station,
> wherein relay logical channel groups are defined, wherein each of the relay logical channels is assigned to one of the relay logical channel groups, and wherein remote logical channel groups are defined, wherein each of the remote logical channels is assigned to one of the remote logical channel groups,
> the relay user equipment comprising:
> a processor configured to generate a relay buffer status report comprising one buffer size field a relay logical channel group, the one buffer size field indicating the total amount of relay data available for transmission across all relay logical channels of said relay logical channel group,
> the processor being further configured to generate a remote buffer status report comprising one buffer size field for a remote logical channel group, the one buffer size field indicating the total amount of remote data available for transmission across all remote logical channels of said remote logical channel group;
> a transmitter configured to transmit the relay buffer status report and the remote buffer status report to the radio base station; and
> a receiver configured to receive, from the radio base station, an uplink resource assignment, assigning radio resources to the relay user equipment for transmitting the remote data and the relay data to the radio base station, the uplink resource assignment being generated by the radio base station based on the relay buffer status report and the remote buffer status report.

19. The relay user equipment according to claim 18, wherein the processor is configured to perform a logical channel prioritization, LCP, procedure so as to allocate the radio resources assigned in the uplink resource assignment
> to the remote logical channels that have the remote data available for transmission to the radio base station and
> to the relay logical channels that have the relay data available for transmission to the radio base station.

20. The relay user equipment according to claim 19, wherein the processor is configured to:
> generate one or more transport blocks carrying the remote data and the relay data, and
> allocate radio resources, during the LCP procedure, to the relay logical channels and the remote logical channels, with data available for transmission, in a decreasing order of a logical channel priority with which each of the relay logical channels and the remote logical channels is associated.

\* \* \* \* \*